US008875606B2

(12) United States Patent  
Hecht

(10) Patent No.: US 8,875,606 B2
(45) Date of Patent: Nov. 4, 2014

(54) MODULAR CUTTING TOOL HOLDER AND CLAMPING MECHANISM THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 162 days.

(21) Appl. No.: 13/552,119

(22) Filed: Jul. 18, 2012

(65) Prior Publication Data

US 2013/0034393 A1 Feb. 7, 2013

Related U.S. Application Data

(60) Provisional application No. 61/514,343, filed on Aug. 2, 2011.

(51) Int. Cl.
  *B23B 29/00* (2006.01)
  *B23B 29/04* (2006.01)

(52) U.S. Cl.
  CPC ........... *B23B 29/046* (2013.01); *B23B 2210/08* (2013.01); *B23B 2231/0204* (2013.01); *B23B 2260/02* (2013.01)
  USPC ................................ 82/158; 82/160; 409/234

(58) Field of Classification Search
  USPC ............. 407/101, 102; 82/160, 158; 409/234; 408/239 A
  See application file for complete search history.

(56) References Cited

U.S. PATENT DOCUMENTS

| 4,453,435 | A |   | 6/1984  | Sauerwald et al. |
|-----------|---|---|---------|------------------|
| 4,632,614 | A | * | 12/1986 | Rall et al. ........................ 409/233 |
| 4,655,655 | A | * | 4/1987  | Schurfeld ........................ 409/232 |
| 4,843,929 | A |   | 7/1989  | Andersson |
| 5,452,631 | A | * | 9/1995  | Erickson ........................ 82/160 |
| 5,555,784 | A | * | 9/1996  | Muendlein et al. ............. 82/158 |
| 5,851,091 | A |   | 12/1998 | Klement |
| 5,873,682 | A | * | 2/1999  | Tripsa ........................... 407/101 |
| 6,109,152 | A |   | 8/2000  | Hecht |
| 6,244,780 | B1 | * | 6/2001 | Hansson ..................... 403/374.3 |
| 6,626,614 | B2 | * | 9/2003 | Nakamura ...................... 408/59 |
| 6,880,437 | B2 | * | 4/2005 | Sjoo et al. ........................ 82/158 |
| 8,469,638 | B2 | * | 6/2013 | Hecht ............................ 407/103 |
| 8,479,622 | B2 | * | 7/2013 | Hecht ............................. 82/158 |
| 2004/0185948 | A1 |   | 9/2004 | Muller |
| 2005/0117987 | A1 |   | 6/2005 | Hansson |
| 2011/0067536 | A1 |   | 3/2011 | Erikson |

FOREIGN PATENT DOCUMENTS

| DE | 361917 C | 10/1922 |
| DE | 4137747 A1 | 5/1993 |
| DE | 102007043953 A1 | 4/2009 |
| GB | 2083386 A | 3/1982 |

OTHER PUBLICATIONS

International Search Report dated Nov. 29, 2012 issued in PCT counterpart application (No. PCT/IL2012/050251).

* cited by examiner

*Primary Examiner* — Will Fridie, Jr.
(74) *Attorney, Agent, or Firm* — Womble Carlyle

(57) ABSTRACT

A modular cutting tool holder portion for a metal-working machine includes a first engagement face configured for clamping engagement with a corresponding second engagement face of a complementary modular cutting tool holder portion. The first engagement face includes a base surface and interlocking elements in the form of exactly four projecting protrusions or exactly four recesses. Each interlocking element includes a non-contact surface spaced from the base surface. The non-contact surface includes two opposing edges between which it extends, and two abutment surfaces each extending from a respective one of the two opposing edges to the base surface and being configured for the clamping engagement.

25 Claims, 9 Drawing Sheets

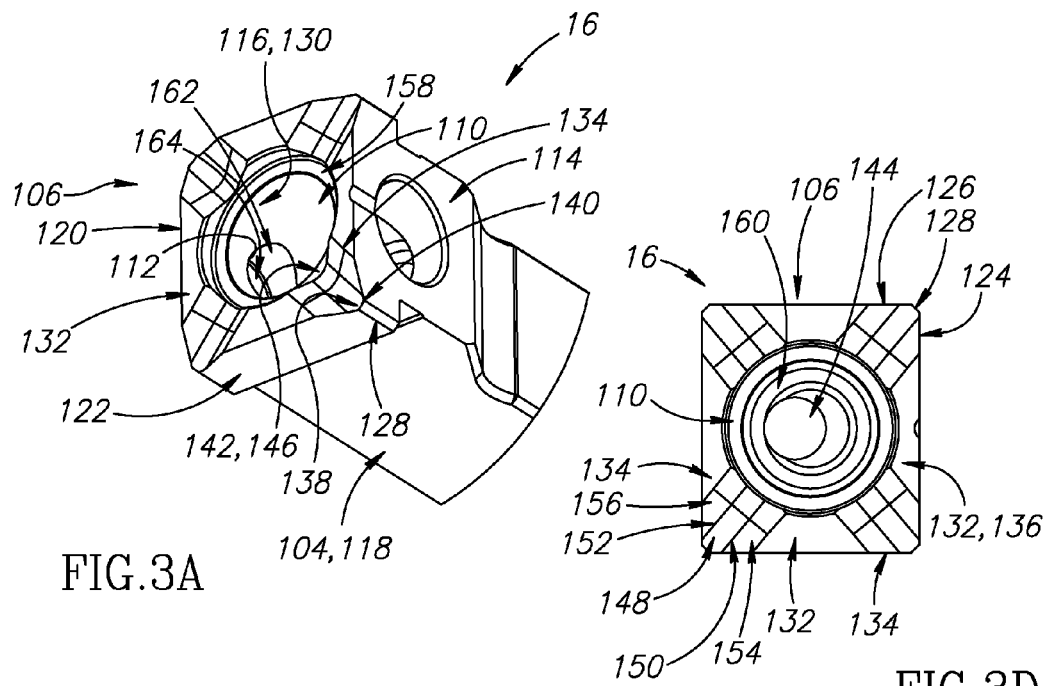
FIG.3A
FIG.3D
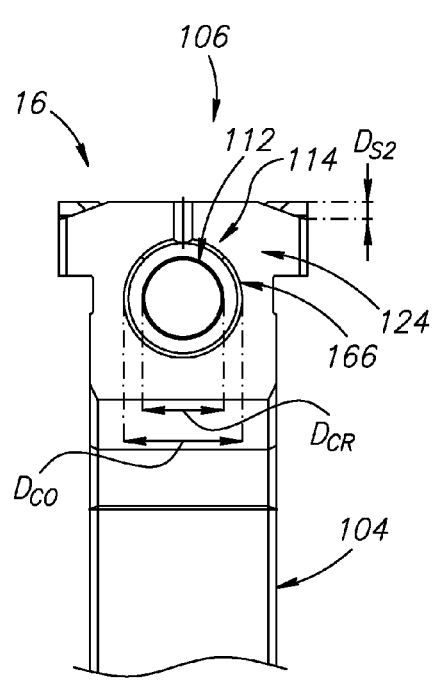
FIG.3B
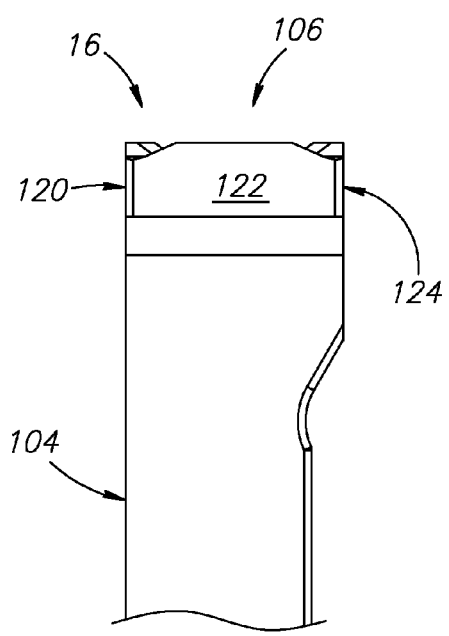
FIG.3C

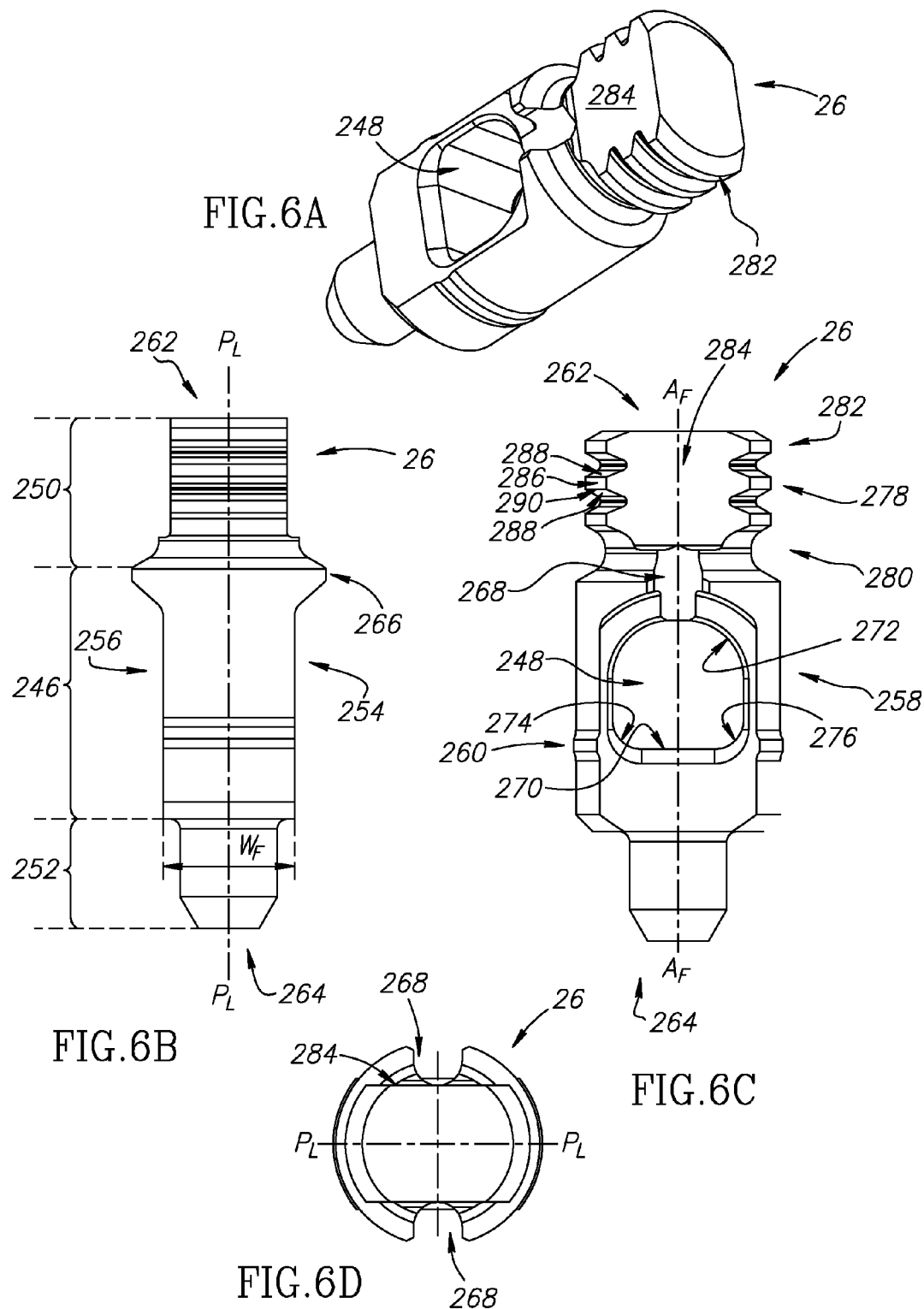

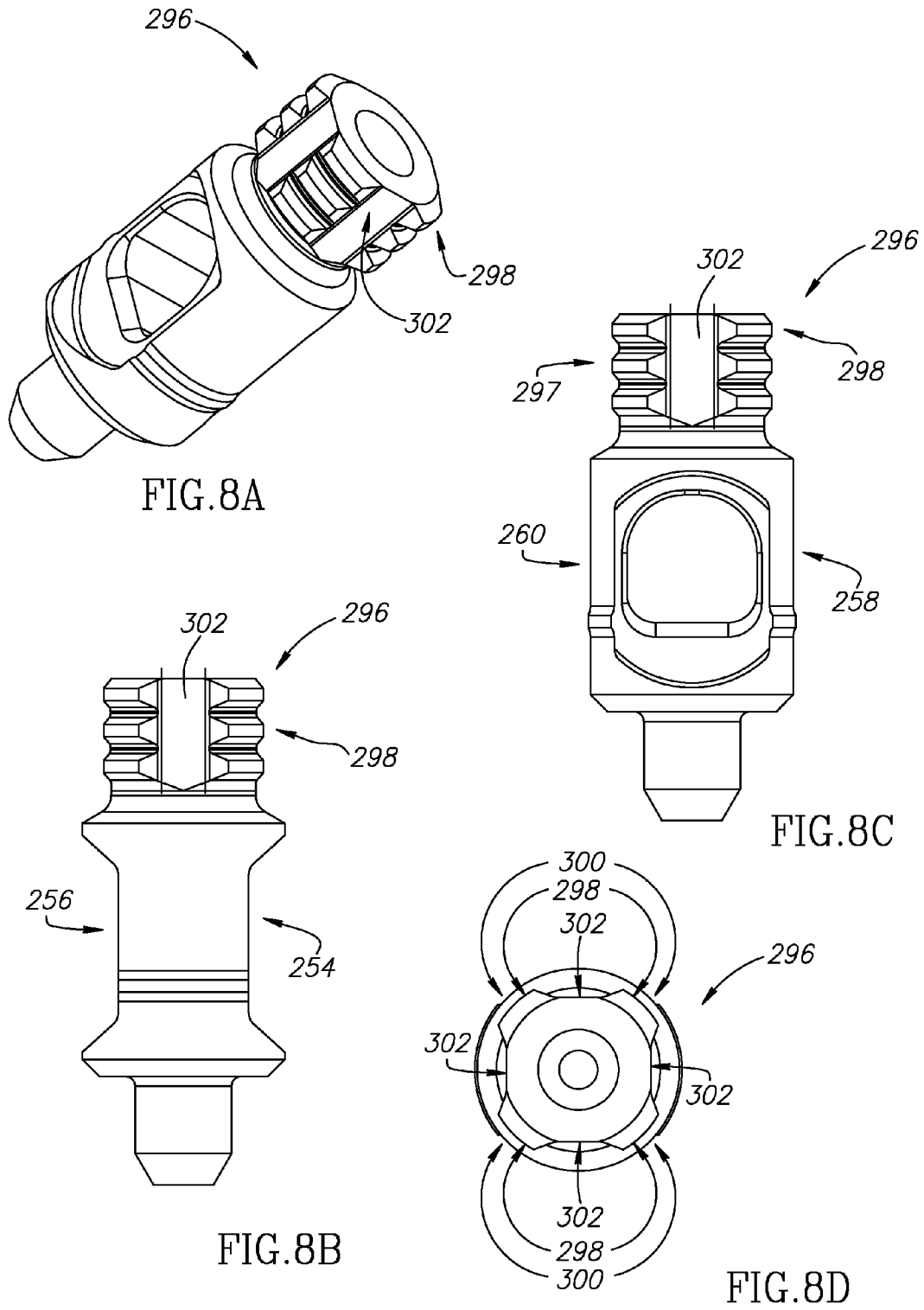

MODULAR CUTTING TOOL HOLDER AND CLAMPING MECHANISM THEREFOR

RELATED APPLICATIONS

The present application claims priority to U.S. Provisional Patent Application No. 61/514,343, filed 2 Aug. 2011, the contents of which are incorporated by reference in their entirety.

FIELD OF THE INVENTION

The subject matter of the present application relates to modular cutting tool holders for metal-working machines, having head and body portions, and clamping mechanisms for securing the head portion to the body portion. The clamping mechanisms can be brought to a clamped position, wherein the head portion is secured to the body portion, and an unclamped position, wherein the head portion can be removed from the body portion.

BACKGROUND OF THE INVENTION

Modular cutting tool holders comprise head and body portions which can be secured to each other in one position and detached from each other in another. The head portion is configured with at least one cutting element. When the at least one cutting element needs to be replaced, the head portion can be detached from the body portion and a new head portion with a different cutting element or elements can be secured thereto.

U.S. Pat. No. 5,873,682 discloses a modular cutting tool holder having a clamping mechanism.

SUMMARY OF THE INVENTION

In accordance with a first aspect of the subject matter of the present application, there is provided a modular cutting tool holder for a metal-working machine, the modular cutting tool holder being configured to hold at least one cutting element and comprising a body portion, a head portion and a clamping mechanism configured to be brought between a clamped position, wherein the head portion is secured to the body portion, and an unclamped position, wherein the head portion is removable from the body portion; the clamping mechanism comprising a follower formed with a through-bore and a cam shaft extending through the through-bore of the follower; the cam shaft comprising a curved section configured for, during rotational motion thereof, engagement with the follower through-bore; the engagement resulting in linear motion of the follower to thereby move the clamping mechanism into the clamped position or unclamped position.

According to a second aspect of the subject matter of the present application, there is provided a head portion for a modular cutting tool holder, the head portion being configured for holding a cutting element, and comprising an engagement face formed with interlocking elements, and a locking bore extending therein from the engagement face; a head portion axis extending through the head portion and coaxially with the locking bore; the locking bore being formed with a one or more grooves, or preferably a plurality of grooves parallel with each other and axially spaced relative to one another along the head portion axis.

According to a third aspect of the subject matter of the present application, there is provided a follower for a modular cutting tool holder, being elongated with a follower axis extending longitudinally through the center thereof, the follower comprising a follower body portion and a follower head portion extending therefrom; the follower head portion comprising one or more ribs, or preferably a plurality of ribs parallel to each other and axially spaced relative to one another along the follower axis.

According to a fourth aspect of the subject matter of the present application, there is provided a modular cutting tool holder comprising a head portion according to the second aspect, and a follower according to the third aspect.

According to a fifth aspect of the subject matter of the present application, there is provided a modular cutting tool holder portion for a metal-working machine, comprising a first engagement face configured for clamping engagement with a corresponding second engagement face of a complementary modular cutting tool holder portion; the first engagement face comprising a base surface and interlocking elements in the form of exactly four projecting protrusions or exactly four recesses; each interlocking element comprising a non-contact surface spaced from the base surface and having two opposing edges between which it extends, and two abutment surfaces each extending from a respective one of the two opposing edges to the base surface and being configured for the clamping engagement.

The portion can be a head portion or a body portion of a modular cutting tool holder.

According to a sixth aspect of the subject matter of the present application, there is provided a modular cutting tool holder for a metal-working machine comprising a body portion and a head portion, each of which having any of the features according to the fifth aspect or described hereinabove or below; wherein one of the body and head portions comprises the interlocking elements in the form of exactly four projecting protrusions and the other of the body and head portions comprises the interlocking elements in the form of exactly four corresponding recesses; and wherein the only contact between the body and head portions is via the abutment surfaces of the interlocking elements.

According to a seventh aspect of the subject matter of the present application, there is provided a tool holder body portion having a clamping mechanism opening for receiving a portion of a cam shaft therein, the clamping mechanism comprising: first and second spaced seating regions defining a constriction in the opening, a major peripheral edge extending from the first seating region to the second seating region and formed on a first side of the constriction, an additional peripheral edge extending from the first seating region to the second seating region and formed on a second side of the constriction distinct from the first side of the constriction.

According to an eighth aspect of the subject matter of the present application, there is provided a modular cutting tool holder for holding a tool holder head portion, comprising a cam shaft and a body portion having a clamping mechanism opening configured for receiving a first portion of a cam shaft therein; the clamping mechanism opening comprising first and second spaced seating regions defining a constriction in the opening, and a major peripheral edge extending from the first seating region to the second seating region and formed on a first side of the constriction; the first portion of the cam shaft, being located at least partially at the first side of a constriction; and a dimension of the constriction, being smaller than an external dimension of the cam shaft's first portion for restricting passage of the cam shaft therethrough.

It will be understood that the subject matter of the present application relates to a modular cutting tool holder and inventive aspects of elements thereof, including but not limited to body portions, head portions, followers, cam shafts, clamping mechanisms, clamping mechanism openings and interlocking arrangements thereof. While each aspect may be separately inventive, they could also be part of a single modular cutting tool holder as will be elaborated below.

It will also be understood that the above-said is a summary, and that any of the aspects above may further comprise any of the features described in connection with any of the other aspects or described hereinbelow. Specifically, the following features, either alone or in combination, may be applicable to any of the above aspects:

A. A cam shaft and follower can be the only elements of a clamping mechanism. Preferably, the clamping mechanism can comprise a biasing member. Even more preferably, in embodiments comprising a tension spring, an additional element of the clamping mechanism can be a screw configured to anchor the biasing member. It will be understood that a small number of components can often result in a more reliable product. Accordingly, the clamping mechanism can comprise only two or three or four members, depending on the configuration above which is desired. In any case the clamping mechanism can comprise two to four elements.

B. A cam shaft can be mounted to a body portion in an arrangement which only allows rotational motion of the cam shaft. Mounting of a cam shaft to a body portion can be at two opposing ends of a cam shaft. The two opposing ends can be located at two opposing sides of a body portion. It will be understood that such arrangements can provide stable operation.

C. A cam shaft can be configured to extend through a follower through-bore in both the clamped and unclamped positions, and any transitional position therebetween. It will be understood that such configuration can assist in preventing undesired ejection of the follower from a body portion.

D. A follower through-bore can comprise a planar section configured to engage a curved section of a cam shaft. Engagement of a cam shaft with a follower through-bore can be with a planar section of a follower through-bore only.

E. A cam shaft can comprise a planar section configured to engage a planar section of a follower through-bore.

F. A curved section of a cam shaft can comprise curved sub-sections each of which has a varying rate of curvature. The varying rate of curvature of each curved sub-section can form a spiral shape. Each curved sub-section can be symmetrical and can be disposed on opposing sides of a bisection plane intersecting the curved section. Each curved sub-section can be configured to engage a follower through-bore and the cam shaft can be configured to be rotated either clockwise or counterclockwise to bring a cutting tool holder to a clamped or unclamped position. Such arrangement can be advantageous when an operator wishes to change position by rotation in any direction (i.e. without having to remember a specific direction). A curvature of each curved sub-section can be configured to allow the tool holder to be brought to the clamped or unclamped position upon about a quarter turn of a cam shaft. Such configuration can allow a rapid change of position. Alternatively, a curved section of a cam shaft can have a single, yet varying, rate of curvature (i.e. not divided into sub-sections). The varying rate of curvature form a spiral shape, preferably an Archimedean spiral. Such arrangement can be advantageous when an operator wishes to have a single defined direction of rotation for each operation of releasing and securing head and body portions. Such configuration can allow a tool holder to be brought to the clamped or unclamped position upon about a half turn of the cam shaft. Preferably the curved section or sections form Archimedean spiral(s).

G. A modular cutting tool holder can comprise a clamping mechanism including a cam shaft, and a clamping mechanism configured for causing the clamping engagement upon clockwise or counterclockwise rotation of the cam shaft. The clockwise or counterclockwise rotation can be a quarter turn of the cam shaft.

H. A follower or cam shaft can be formed with a projecting mechanical stopper to halt motion relative to each other (for example, the mechanical stopper can be adjacent to an upper portion, i.e. in the position of the recess shown in the exemplary embodiment in FIG. 6C, and a second end section of a cam shaft can follow a growth pattern to engage the mechanical stopper).

I. A cam shaft can comprise a tool receiving recess having a removal arrangement disposed thereat. The removal arrangement can comprise at least one laterally extending anchoring wall portion.

J. A modular cutting tool holder, or more specifically a clamping mechanism thereof, can comprise a biasing member. The biasing member can be configured to provide a biasing force sufficient to space the body portion from the head portion, when the head portion is seated on the body portion and the body portion is held in a vertical orientation. Such configuration can be such that the two portions can be rotated relative to one another by application of rotational force only. Alternatively, the biasing member can be in the form of a tension spring. In such case the biasing member can be configured to provide a biasing force to draw together the body portion and a head portion, and align them in a static clamped position.

K. A biasing member can be configured to apply a continuous biasing force on a follower in both clamped and unclamped positions, and any transitional position therebetween. Such continuous biasing force can possibly assist in preventing undesired ejection of a cam shaft from a body portion.

L. A body portion and a head portion can be configured for clamping engagement with each other at four different rotated positions. A modular cutting tool holder can be configured to be brought to the four different rotated positions via successive quarter turns of the body portion or the head portion.

M. A plurality of grooves can include a first set including two or more grooves formed at a first grooved sub-surface of a locking bore.

N. A head portion can comprise a second set of grooves including two or more grooves formed at a second grooved sub-surface being distinct from the first grooved sub-surface.

O. First and second grooved sub-surfaces can be separated from one another by non-grooved first and second sub-surfaces of a locking bore. The non-grooved sub-surfaces can be devoid of a radially inwardly projecting wall portion.

P. Each sub-surface formed with grooves can comprise exactly three axially spaced grooves.

Q. There can be exactly two sub-surfaces formed with grooves. Alternatively, there can be exactly four sub-surfaces formed with grooves.

R. A plurality of ribs can extend from a first face of a follower head portion. The plurality of ribs can comprise a plurality of ribs extending from a second face of the follower head portion, the second face being distinct from the first face. The first and second faces can be separated from one another by third and fourth faces of the follower head portion, the third and fourth faces each being devoid of ribs. Each face formed with the plurality of ribs can comprise exactly three axially spaced ribs. There can be exactly two faces formed with the plurality of ribs. Alternatively, there can be exactly four sub-faces formed with the plurality of ribs.

S. A follower can be formed with at least one recess disposed at a face thereof which is devoid of ribs.

T. A first engagement face can be formed with a bore extending therein.

U. A modular cutting tool holder portion can be a head portion configured for holding a cutting element. In such case it is preferred that the interlocking elements are exactly four projecting protrusions.

V. A modular cutting tool holder portion can be a body portion configured for holding a head portion which in turn is configured for holding a cutting element. In such case it is preferred that the interlocking elements are exactly four recesses.

W. The body portion can be made of a material having greater stiffness than a material of which the head portion is made.

X. Each interlocking element can be disposed at a portion of a first engagement face which is distal to a centerpoint thereof. Stated differently, it is preferred that interlocking elements of an engagement face is located at a periphery of the engagement face.

Y. Each interlocking element can have a tapered shape.

Z. Each abutment surface can be planar.

AA. All of the abutment surfaces of the head portion and all of the abutment surfaces of the body portion can be configured to contact each other simultaneously (i.e., each abutment surface of the body portion is configured to contact an associated abutment surface of the head portion). Such arrangement can prevent, for example, wobbling. It will be understood that even two abutment surfaces of the head portion which contact two respective abutment surfaces of the body portion can be sufficient to prevent relative rotation of the head and body portions in both the clockwise and counterclockwise directions (given that the abutment surfaces are oppositely slanted, e.g., as in the case of two contacting abutments surfaces belonging to a single interlocking element etc.). The further possible advantage of simultaneous contact of abutment surfaces at each side of engagement faces can contribute to prevention of wobbling. Such stabilization can be possibly further enhanced by positioning the interlocking elements at a periphery of the engagement faces.

BB. A head portion and a body portion can be configured to rotate, relative to each other, in the clockwise and counterclockwise direction in an attached-unlocked or attached-locked position.

CC. A modular cutting tool holder can be configured to be brought to both a clamped and an unclamped position with a cam shaft and a follower both still being held to a body portion thereof.

DD. Interlocking elements can be evenly spaced along a periphery of each engagement face.

EE. Each abutment surfaces can be slanted with respect to a base surface and/or a non-contact surface.

FF. First and corresponding second engagement faces can be configured for clamping engagement with each other at four different positions.

GG. A modular cutting tool holder can be configured to be brought to each of four different positions via successive quarter turns of one of the body portion and head portion, relative to the other.

HH. A body portion can be configured such that a first seating region can have a first seating center point and a second seating region can have a second seating center point.

II. A major peripheral edge can comprise two major edge ends, each major edge end being adjacent a corresponding one of the seating regions, the major peripheral edge having a major center point defined by a largest possible arc which can be inscribed within the major peripheral edge.

JJ. An additional peripheral edge can comprise two additional edge ends, each additional edge end being adjacent a corresponding one of the seating regions on the second side, the additional peripheral edge having an additional center point defined by a largest possible arc which can be inscribed within the additional peripheral edge.

KK. A major center point and an additional center point can be spaced from both the first and second seating center points.

LL. First and second seating center points can be colocated at a common seating center point.

MM. A major center point and an additional center point can be respectively located at one of the first and second sides of the constriction. The major center point and the additional center point can be disposed on an imaginary plane which passes between the first and second spaced seating regions and extends on both sides of the constriction. The major peripheral edge and/or the additional peripheral edge can have a concave shape.

NN. At least one of the seating regions can have a concave shape, in a plan view of the clamping mechanism opening.

OO. At least one of the seating regions can comprise a line segment, in a plan view of the clamping mechanism opening.

PP. A clamping mechanism opening can comprise an additional peripheral edge which extends from the first seating region to the second seating region and is formed on a second side of a constriction distinct from the first side thereof, and wherein the constriction is sized to prevent passage of the cam shaft therethrough to the extent that it can contact the additional peripheral edge.

QQ. A clamping mechanism opening can comprise an uppermost central point and a lowermost central point located further from a head portion than the uppermost central point.

RR. Seating regions can be closer to the uppermost central point than to the lowermost central point.

SS. A modular cutting tool holder can comprise an additional clamping mechanism opening having first and second spaced seating regions defining a constriction in the opening, and formed in a body portion and configured to receive a second portion of a cam shaft, distinct from a first portion of a cam shaft, therein.

TT. Half of a magnitude of a maximum dimension of an end portion received in a clamping mechanism opening can be smaller than a magnitude of a radius of a major peripheral edge.

UU. Seating regions can have a curvature corresponding to a curvature of an end portion received therein.

VV. A clamping mechanism opening can have a non-circular shape.

WW. A clamping mechanism opening can be configured for receiving a portion of a cam shaft therein. More precisely, a major peripheral edge thereof can be configured for receiving a portion of a cam shaft therein.

XX. A first seating region can have a first seating center point and the second seating region can have a second seating center point.

YY. A major peripheral edge can comprise two major edge ends. Each major edge end can be adjacent a corresponding one of the seating regions. The major peripheral edge can have a major center point defined by a largest possible arc which can be inscribed within the major peripheral edge.

ZZ. An additional peripheral can comprise two additional edge ends. Each additional edge end can be adjacent a corresponding one of the seating regions on the second side. The additional peripheral edge having an additional center point defined by a largest possible arc which can be inscribed within the additional peripheral edge.

AAA. A major centerpoint and an additional center point can be spaced from both first and second seating center points.

BRIEF DESCRIPTION OF THE DRAWINGS

For a better understanding of the subject matter of the present application, and to show how the same may be carried out in practice, reference will now be made to the accompanying drawings, in which:

FIG. 3A is a perspective side view of a body portion of the cutting tool holder in FIGS. 1A and 1B;

FIG. 3B is a side view of the body portion in FIG. 3A;

FIG. 3C is another side view of the body portion in FIGS. 3A and 3B, rotated 90° from the view in FIG. 3B;

FIG. 3D is a plan view of the body portion;

FIG. 6A is a perspective side view of a follower of the cutting tool holder in FIGS. 1A and 1B;

FIG. 6B is a side view of the follower in FIG. 6A;

FIG. 6C is a side view of the follower in FIGS. 6A and 6B, rotated 90 degrees from the view in FIG. 6B;

FIG. 6D is a plan view of the follower in FIGS. 6A to 6C;

FIG. 8A is a perspective side view of another follower;

FIG. 8B is a side view of the follower in FIG. 8A;

FIG. 8C is a side view of the follower in FIGS. 8A and 8B, rotated 90° from the view in FIG. 8B;

FIG. 8D is a plan view of the follower in FIGS. 8A to 8C;

DETAILED DESCRIPTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein.

Figures 1A, 1B:
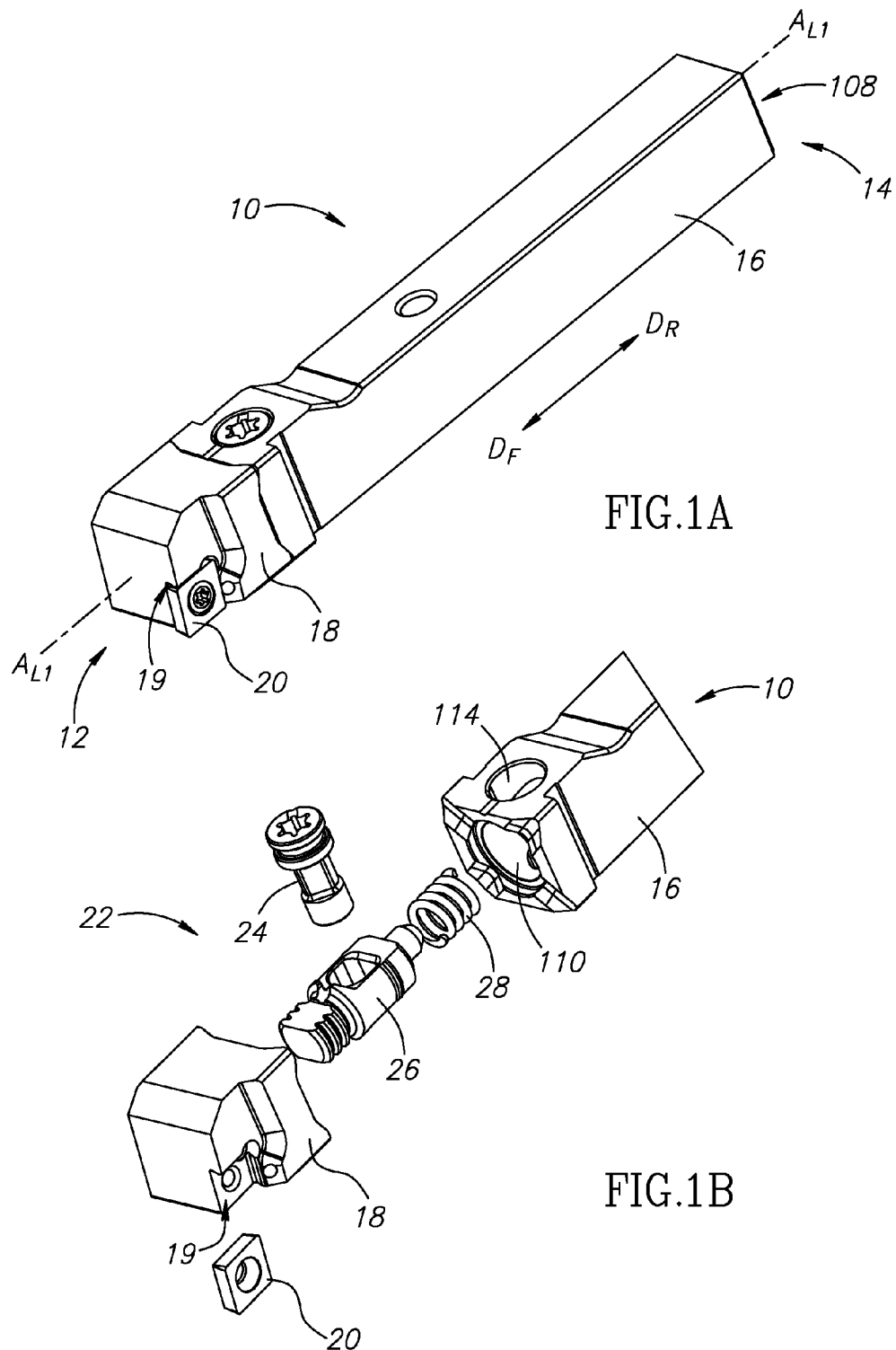
FIG. 1A is a perspective side view of a cutting tool holder in a clamped state.
FIG. 1B is an exploded view of a portion of the cutting tool holder in FIG. 1A.

Reference is now made to FIG. 1A, showing an elongated modular cutting tool holder 10 with a longitudinal axis $A_{L1}$ extending longitudinally through the center thereof, and comprising front and rear ends (12, 14) defining forward and rearward directions ($D_F$, $D_R$) extending parallel with the longitudinal axis $A_{L1}$.

The cutting tool holder 10 can be a rotary cutting tool holder. The cutting tool holder 10 comprises a body portion 16 and a head portion 18.

The head portion 18 can comprise a cutting element 20. The head portion 18 can be configured to hold only a single cutting element 20 or a plurality of cutting elements 20. Each cutting element 20 can be a cutting insert. The head portion 18 can be formed with a pocket 19 for holding the cutting element 20.

Referring now also to FIG. 1B, the head portion 18 is securable to the body portion 16 via a clamping mechanism 22.

The clamping mechanism 22 comprises a cam shaft 24 and a follower 26. The clamping mechanism 22 can also comprise a biasing member 28, which in this non-limiting example is a spring. Elements which are considered to belong to a clamping mechanism are those which cause movement of a head portion into the clamped or unclamped positions.

The clamping mechanism 22 is configured to be brought between an unclamped position and a clamped position, via rotation of the cam shaft 24 which causes linear motion of the follower 26 along the longitudinal axis $A_{L1}$ through engagement therewith. Linear motion of the follower 26 can allow the head portion 18 to be clamped to, or unclamped from, the body portion 16.

It will be appreciated that a possible advantage of the clamping mechanism 22 is the small number of elements which it utilizes. In this example, the clamping mechanism 22 can be configured for clamping or unclamping of the head portion 18 to the body portion 16 with only two elements, namely the cam shaft 24 and follower 26. A third element, the biasing member 28, may accelerate the change of positions and/or dispose the head portion 18 at an extended position from the body portion 16, which may assist ease of removal of the head portion 18, but is not essential for operation of the clamping mechanism 22. In some preferred embodiments, the biasing member 28 could be a tension spring (not shown), as an alternative to the compression spring shown exemplified, which could provide an advantageous locating function (i.e. when securing a head portion to a body portion, the spring can assist in positioning the portions). Including the biasing member 28, the clamping mechanism 22 can be configured for clamping or unclamping of the head portion 18 to the body portion 16 with only three elements (or four elements if an anchoring member is needed to hold the biasing member at one end thereof).

Drawing attention to FIGS. 2A to 2D, the head portion 18 will be described in further detail.

The head portion 18 can comprise a peripheral surface 30 extending between an engagement face 32 and an opposing top face 34. The pocket 19 can be formed at an intersection of the peripheral surface 30 and top face 34. The head portion 18 can be formed with a locking bore 36 extending therein from the engagement face 32. A head portion axis $A_H$ (FIG. 2C) can extend through the head portion 18 and coaxially with the locking bore (36).

The peripheral surface 30 can comprise a plurality, for example four, sub-surfaces (38, 40, 42, 44). However it will be appreciated that the peripheral surface 30 could instead be cylindrical, in which case there would only be one continuous surface. Alternatively, the peripheral surface 30 could be differently shape and have a corresponding number of sub-surfaces as required. Each pair of adjacent sub-surfaces (38, 40, 42, 44) can meet at a common edge 46. One or more of the common edges 46 can extend from the engagement face 32 to the top face 34.

The engagement face 32 can comprise a base surface 48 and interlocking elements 50. The interlocking elements 50 can be exactly four interlocking elements, each in the form of an outwardly projecting protrusion 50. The interlocking elements 50 can have identical shapes, as is the case in the shown embodiment.

The base surface 48 can be planar. The base surface 48 can have a ring-shaped inner portion 52 thereof disposed between one of the protrusions 50 and the locking bore 36. The base surface 48 can have a plurality of inner portions 53, each being disposed between one of the protrusions 50 and the locking bore 36. The base surface 48 can have an outer portion 54 thereof disposed between adjacent protrusions 50. The base surface 48 can have a plurality of outer portions 54, each of which being disposed between a different pair of adjacent protrusions 50.

Figure 2D:
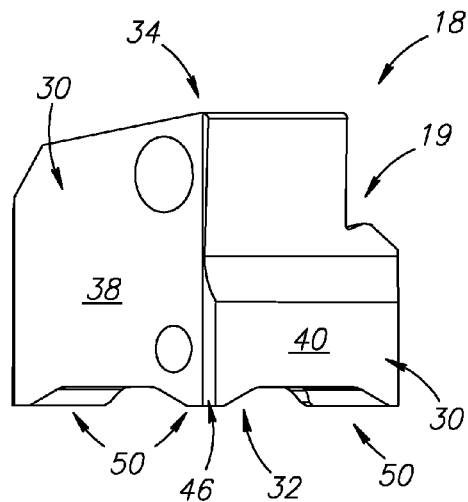
FIG. 2D is another perspective side view of the head portion in FIGS. 2A to 2C.
Figure 2B:
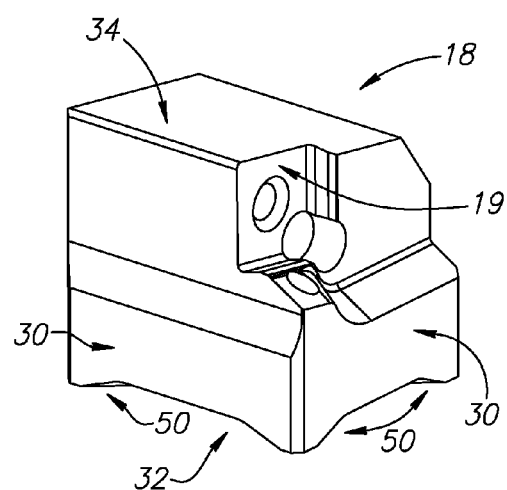
FIG. 2B is a perspective side view of the head portion in FIG. 2A.
Figure 2A:
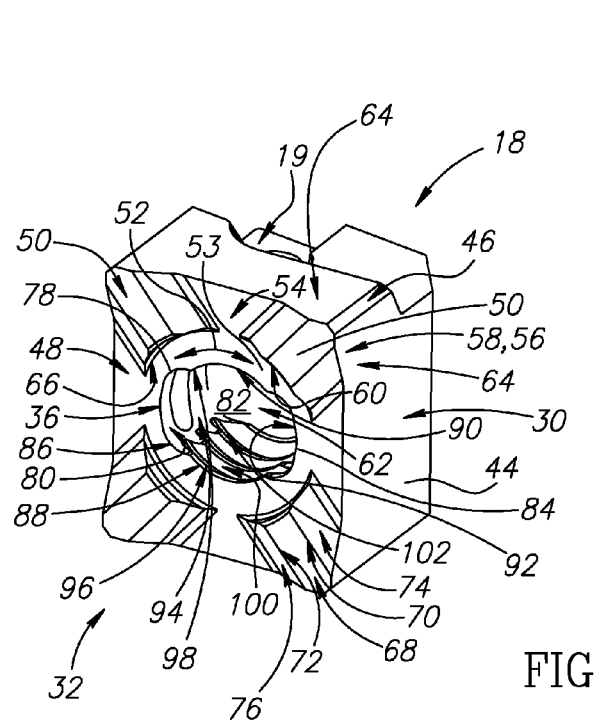
FIG. 2A is a perspective bottom view of a head portion of the cutting tool holder in FIGS. 1A and 1B.

The protrusions 50 can be located at the periphery of the engagement face 32. Stated differently, each protrusion 50 can have a first end 56 located at an intersection 58 of the engagement face 32 and the peripheral surface 30 (which can also be called an "external peripheral surface 30"), and can extend from the first end 56 to a second end 60 disposed along the engagement face 32 and spaced from the peripheral surface 30. Thus, as seen in FIG. 2A, the protrusions 50 extend from a first end 50 proximate to the external peripheral surface 30, in an inward direction, to a second end 60 further from the external peripheral surface 30 than the first end 50. In embodiments where the peripheral surface 30 comprises adjacent sub-surfaces (38, 40, 42, 44), adjacent pairs meeting at a common edge 46, the protrusion's first end 56 can be located at an intersection of the engagement face 32 and the peripheral surface 30 at the common edge 46. The intersection can also extend to parts of the peripheral surface 30 adjacent to the common edge 46. In the non-limiting example shown, intersections of the engagement face 32 and the common edges 46 constitute the most distal portions of the engagement face 32 from a centerpoint 62 thereof. The centerpoint 62 of the engagement face 32, in this example, is also a centerpoint of the locking bore 36. Each of the protrusions 50 can be disposed at portions of the engagement face 32 which are distal to the centerpoint 62 thereof. The inner portion 52 can be further defined as being possibly disposed between the second end 60 and the locking bore 36.

An outermost surface or surfaces 64 of the first end 56 of each protrusion at the peripheral surface 30 can be planar. An outermost surface 66 of the second end 60 of each protrusion can be concave.

Each protrusion 50 comprises a non-contact surface 68 spaced from the base surface 48 and having two opposing edges (70, 72) between which it extends, and two abutment surfaces (74, 76) each extending from a respective edge (70, 72) of the non-contact surface 68 to the base surface 48.

Figure 2C:
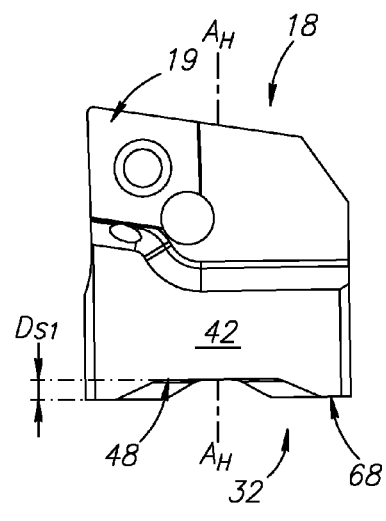
FIG. 2C is a side view of the head portion in FIGS. 2A and 2B.

The non-contact surface 68 can be planar. Each non-contact surface 68 can be coplanar with the other non-contact surfaces 68. Each non-contact surface 68 can be coplanar with the base surface 48. Each non-contact surface 68 can be spaced from the base surface 48 a common magnitude of distance $D_{S1}$ (FIG. 2C).

The abutment surfaces (74, 76) can be planar. The abutment surfaces (74, 76) can be slanted with respect to the base surface 48 and/or the non-contact surface 68. The abutment surfaces (74, 76) of each protrusion 50 can be a minor image of each other about the non-contact surface 68. Stated differently, the abutment surfaces (74, 76) of each protrusion 50 can be equally slanted with respect to the base surface 48 and/or the non-contact surface 68, with one abutment surfaces (74, 76) having a positive slant and the other having a negative slant.

Stated differently, the protrusions 50 can each have a tapered shape.

The locking bore 36 can comprise a bore edge 78 at the engagement face 32, a bore internal surface 80 extending from the bore edge 78 inwardly into the head portion 18, and a bore end surface 82 distal from the engagement face 32.

The bore edge 78 can have opposing first and second sub-edges (84, 86) and opposing third and fourth sub-edges (88, 90) extending therebetween. Each sub-edge (84, 86, 88, 90) can have a concave shape.

The bore edge 78 has an elongated shape. The elongation can be between the first and second sub-edges (84, 86). Stated differently, a magnitude of distance between the first and second sub-edges (84, 86) can be greater than a magnitude of distance between the third and fourth sub-edges (88, 90).

Each portion of the bore internal surface 80 extending between the bore edge 78 and the end surface 82 can have a corresponding shape to that of an adjacent sub-edge of the bore edge 78. Accordingly, the bore internal surface 80 can have first, second, third and fourth sub-surfaces (92, 94, 96, 98), each of which can have a concave shape, and can be elongated between two of the sub-surfaces (92, 94) which are opposite each other.

Each of the third and fourth sub-surfaces (96, 98), can be formed with at least one groove 100. Each groove 100 can be separated by a wall portion 102. Each of the third and fourth sub-surfaces (96, 98), can be formed with a plurality of grooves 100. Consequently, the third and fourth sub-surfaces (96, 98) can be considered grooved sub-surfaces. The grooves at each of the third and fourth sub-surfaces (96, 98) can be formed with a set of grooves comprising two or more grooves. One or both of the third and fourth sub-surfaces (96, 98), can be formed with exactly three grooves 100. Each groove can have a curved shape. Within a set, each of the plurality of grooves 100 can be parallel with each other. Also within a set, each of the plurality of grooves 100 can be axially spaced, relative to the follower axis ($A_F$). In the non-limiting embodiment shown, there are exactly two sub-surfaces, i.e. the third and fourth sub-surfaces (96, 98) formed with a plurality of grooves 100.

Each of the first and second sub-surfaces (92, 94), can be spaced further from the centerpoint 62 than the wall portions 102. Such spacing can allow insertion of the follower 26 into the locking bore 36, as will be clarified hereinafter. Each of the first and second sub-surfaces (92, 94) can be disposed between or can be separate sub-surfaces (96, 98) formed with grooves 100. Each of the first and second sub-surfaces (92, 94) can be devoid of a radially inwardly projecting wall portion, i.e. such as the wall portions 102. The first and second sub-surfaces (92, 94), can be considered non-grooved sub-surfaces. The non-grooved sub-surfaces (92, 94) can separate the third and fourth sub-surfaces (96, 98).

Drawing attention to FIGS. 3A to 3D the body portion 16 will be described in further detail.

In some embodiments, the body portion 16 can be made of a material having greater stiffness than a material of which the head portion 18 is made. For example the body portion 16 can be made of tungsten carbide and the head portion 18 can be made of steel. The body portion 16 can comprise a peripheral wall 104 extending between a forward engagement face 106 and an opposing rear end face 108 (FIG. 1A). The body portion 16 is formed with a body portion bore 110 extending therein from the forward engagement face 106, a cam recess 112 and a cam opening 114.

The peripheral wall 104 can have opposing internal and external surfaces (116, 118).

The external surface 118 (which can also be called an "external peripheral surface 118") can comprise a plurality of, for example four, sub-surfaces (120, 122, 124, 126).

The internal surface 116 can comprise a plurality of sub-surfaces, which, with the exception of one sub-surface 130 (FIG. 3A), are not shown. The internal surface 116 can comprise exactly four sub-surfaces. Each internal sub-surface can extend parallel with an opposing external sub-surface. Alternatively, the internal surface 116 can be cylindrical.

The forward engagement face 106 can comprise a base surface 132 and interlocking elements 134. The interlocking elements 134 can be exactly four interlocking elements, each in the form of a recess 134. The interlocking elements 134 can have identical shapes, as is the case in the shown embodiment.

The base surface 132 can be planar. The base surface 132 can have an outer portion 136 thereof disposed between one of the recesses 134 and an adjacent recess 134. There can be an outer portion 136 disposed between each pair of adjacent recesses 134.

The recesses 134 can be located at the periphery of the forward engagement face 106. Stated differently, and referring briefly to FIG. 3A only, each recess 134 can extend in a radially inward direction from a first end 138 at an intersection 140 of the forward engagement face 106 and the peripheral wall 104, to a second end 142 disposed along the forward engagement face 106 and spaced from the peripheral wall 104. Thus, as seen in FIG. 3A, the recesses 134 extend from a first end 138 proximate to the external peripheral surface 118, in an inward direction, to a second end 142 further from the external peripheral surface 118 than the first end 138. In embodiments where the peripheral wall 104 comprises adjacent sub-surfaces (120, 122, 124, 126), with adjacent pairs meeting at a common edge 128, the recesses' first end 138 can be located at an intersection of the engagement face 32 and the peripheral wall 104 at the common edge 128. The intersection can also extend to parts of the peripheral wall 104 adjacent to the common edge 128. In the non-limiting example shown, intersections of the forward engagement face 106 and the common edges 128 are the portions of the forward engagement face 106 which are most distal from a centerpoint 144 of the forward engagement face 106.

The centerpoint 144 of the forward engagement face 106, in this example, is also the centerpoint of the body portion bore 110. Each of the recesses 134 can be disposed at portions of the forward engagement face 106 which are distal to the centerpoint 144 thereof.

An outermost surface 146 of the second end 142 of each recess 134 can be concave.

Referring to FIG. 3D, each recess 134 comprises a non-contact surface 148 spaced from the base surface 132 and having two opposing edges (150, 152) between which it extends, and two abutment surfaces (154, 156) each extending from a respective edge (150, 152) of the non-contact surface 148 to the base surface 132.

The non-contact surface 148 can be planar. Each non-contact surface 148 can be coplanar with the others. Each non-contact surface 148 can be parallel to the base surface 132. Each non-contact surface 148 can be spaced from the base surface 132 an equal magnitude of distance $D_{S2}$ (FIG. 3B).

The abutment surfaces (154, 156) can be slanted with respect to the base surface 132 and/or the non-contact surface 148. The abutment surfaces (154, 156) can be planar. The abutment surfaces (154, 156) of a given recess 134 can be minor images of each other about the non-contact surface 148. Stated differently, the abutment surfaces (154, 156) of each recess 134 can be equally slanted with respect to the base surface 132 and/or the non-contact surface 148, with one of the abutment surfaces (154, 156) having a positive slant and the other having a negative slant.

Stated differently, the recesses 134 can each have a tapered shape.

The abutment surfaces (154, 156) of the body portion 16 are configured to interlock with the abutment surfaces (74, 76) of the head portion 18.

As best seen in FIG. 3A, the body portion bore 110 can be defined between a bore edge 158 at the forward engagement face 106, the internal surface 116 and an end surface 160 (FIG. 3D).

The bore edge 158 can be circular.

The cam recess 112 (FIG. 3A) can be formed in the internal sub-surface 130, and can have a peripheral surface 162 which extends from the body portion bore 110 to an end wall portion 164 which is part of the peripheral wall 104.

Referring now to FIG. 3B, the cam recess 112 can be coaxial with the cam opening 114. The cam recess 112 can have a diameter $D_{CR}$, which is the diameter of a largest possible circle which can be inscribed therein, which is smaller than a diameter $D_{CO}$ of the cam opening 114, which is the diameter of a largest possible circle which can be inscribed therein.

The cam opening 114 can be in the form of an aperture having a continuous edge 166. A possible advantage of the cam opening 114 having a continuous edge 166 is that the cam opening 114 can be surrounded by material, providing a reinforced construction. Notably, the cam opening 114 is non-circular.

Figure 4A:
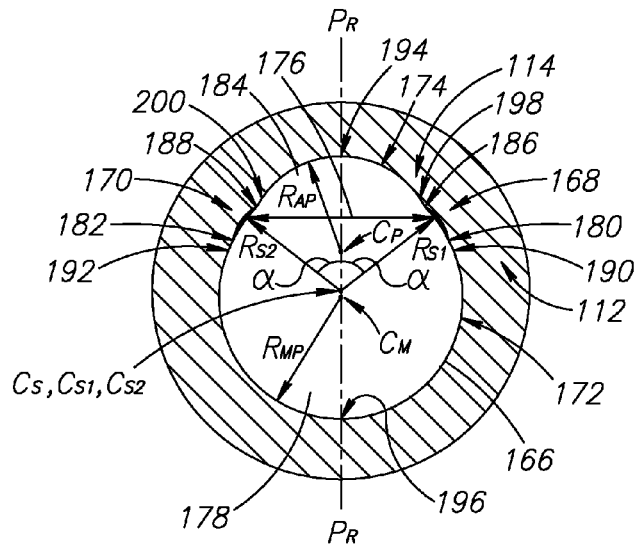
FIG. 4A is a partial schematic side view of a cam opening of the body portion in FIGS. 3A to 3D, which has been enlarged and portions of which have been drawn out of proportion for the purposes of explanation.

Referring to FIG. 4A, further features of the non-circular cam opening 114 are shown in a front view thereof (or a side-view of the body portion 16). While the further features are described with respect to the cam opening 114, they can be applied to any clamping mechanism opening. For example, the cam recess 112 can have any of the features mentioned below with respect to the cam opening 114 or alternative cam opening 114' shown in FIG. 4C.

The cam opening 114 can be defined, in a plan view thereof, by two spaced seating regions (168, 170), a major peripheral edge 172 and, in this non-limiting example, an additional peripheral edge 174. The two spaced seating regions (168, 170) define between them a constriction 176 within the cam opening 114 (the constriction being indicated in FIG. 4A by the double-headed arrow). The major peripheral edge 172 is formed on a first side 178 of the constriction 176 and has two opposite major edge ends (180, 182). Each major edge end (180, 182) can be adjacent a corresponding one of the seating regions (168, 170). The additional peripheral edge 174 can be formed on a second side 184 of the constriction (176) and seating regions (168, 170), opposite from the major peripheral edge 172. The second side 184 of the constriction 176 being distinct from the first side 178 thereof. The additional peripheral edge 174 can extend between two additional edge ends (186, 188), each additional edge end being, in this non-limiting example, adjacent a corresponding one of the seating regions (168, 170). A vertically extending imaginary plane $P_R$ of the cam opening 114 can pass between the two spaced seating regions (168, 170) and extend on both sides of the constriction 176.

The major peripheral edge 172 can have a concave shape. The major peripheral edge 172 can have a magnitude of radius $R_{MP}$ which is measured from a major center point $C_M$ of a largest possible circular arc which can be inscribed therein. The major peripheral edge 172 includes points (190, 192) directly adjacent each edge end (180, 182).

Figure 4B:
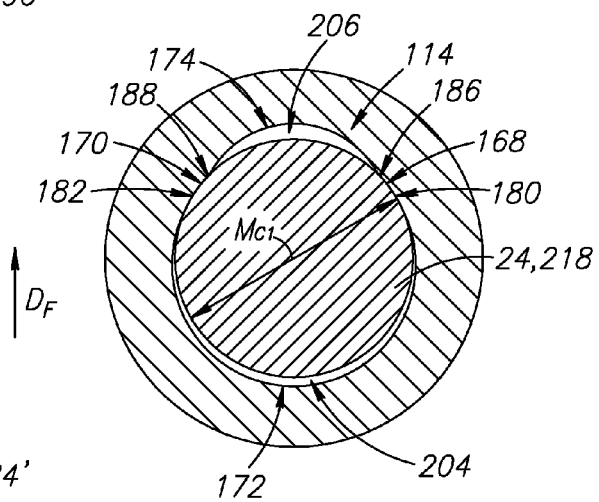
FIG. 4B is a partial schematic side view of the cam opening in FIG. 4A with a cam shaft of the cutting tool holder in FIGS. 1A and 1B, shown inserted therein.

It is understood that the "largest possible circular arc which can be inscribed" in the major peripheral edge 172 corresponds to a circular arc having a magnitude of radius which is larger than that of the cam shaft 24 shown in FIG. 4B. This explanation also applies to other major peripheral edges in accordance with the subject matter of the present application and to inscribed circles and inscribed circular arcs mentioned in connection with seating regions and additional peripheral edges.

The seating regions (168, 170) can each have a concave shape, in the plan view shown. The seating regions (168, 170) can each have a magnitude of radius ($R_{S1}$, $R_{S2}$), each radius being measured from a corresponding center point $C_{S1}$, $C_{S2}$, which in this non-limiting example are colocated and thereby together comprise a common center point $C_S$, of a largest possible circular arc which can be inscribed therein. The seating regions (168, 170) are spaced from each other. The seating regions (168, 170) can be closer to an uppermost central point 194 of the cam opening 114, than to a lowermost central point 196 which is disposed opposite the uppermost central point 194. In other words, an angle α formed between each seating region (168, 170) and the vertically extending imaginary plane $P_R$, which in this non-limiting example is a common angle, can be an acute angle. The plane $P_R$ can extend parallel with the forward and rearward directions ($D_F$, $D_R$). Both the uppermost central point 194 and the lowermost central point 196 can lie in the plane $P_R$.

In some instances, a given seating region, rather than having a concave shape in the plan view of the opening, may have a shape which can be characterized as a line segment. Such line segment can have a slope or average slope and a segment length. The center point for such a seating region may be defined as the point at which an imaginary line perpendicular to the midpoint of such a segment intersects the plane $P_R$. In this manner, center points may be defined for a non-concave seating region which forms a portion of the contour of the cam opening 114.

The additional peripheral edge 174 can have a concave shape. The additional peripheral edge 174 can have a magnitude of radius $R_{AP}$ which is measured from a center point $C_P$ of a largest possible circular arc which can be inscribed therein. The additional peripheral edge 174 can also comprise points (198, 200) directly adjacent each edge end (180, 182), which will be discussed hereinafter.

The major center point ($C_M$) and the additional center point ($C_P$) can be respectively located at one of the first and second sides (178, 184) of the constriction (176, 176'). More precisely in this example, the center points ($C_M$, $C_S$, $C_P$) of the major peripheral edge 172, seating regions (168, 170) and additional peripheral edge 174, can all be spaced from each other along the plane $P_R$.

Referring to FIG. 4B, a portion 218 of the cam shaft 24 is shown disposed in the cam opening 114 and forced thereagainst in the forward direction $D_F$.

Half of the magnitude of a maximum dimension $M_{C1}$ of the portion 218, i.e. the magnitude of radius thereof, is smaller than the magnitude of the radius $R_{MP}$ of the major peripheral edge 172. Therefore, the major peripheral edge 172 is sized to allow the cam shaft 24 to be inserted in and rotated within the cam opening 114, when there is no force applied thereagainst in the forward direction $D_F$ causing engagement with the seating regions (168, 170). The size difference also forms a proximal space 204, located between the cam shaft 24 and major peripheral edge 172.

The magnitude of radius $R_{S1}$, $R_{S2}$ of the seating regions (168, 170) can be equal to half of the magnitude of the maximum dimension $M_{C1}$ of the first end 218 (FIG. 5B) of the cam shaft 24. The seating regions (168, 170) can have a curvature corresponding to the curvature of the first end 218 (FIG. 5B) of the cam shaft 24.

Even when a force is applied to the cam shaft 24 in the forward direction $D_F$, as shown, and the cam shaft 24 engages the seating regions (168, 170), the constriction (176) and the additional peripheral edge 174 are sized to form a distal space 114, the size being configured to restrict entry of the cam shaft 24 therein, i.e. within which the cam shaft 24 is not located. Stated differently, complete entry of the cam shaft 24 into the distal space 206 is restricted by engagement of the cam shaft 24 with the seating regions (168, 170). Consequently, the constriction (176) and the additional peripheral edge 174 are sized to prevent contact of the cam shaft 24 with the uppermost central point 194 thereof. Stated differently, the constriction 176 is sized to prevent passage of the cam shaft 24 therethrough to the extent that it can contact the additional peripheral edge 174.

The engagement of the cam shaft 24 with more than one seating regions (168, 170) can be achieved by provision of the distal space 206.

It will be appreciated that any one of the clamping features mentioned above can possibly assist in restricting rotational motion of the cam shaft 24 when a force is applied thereon in the forward direction $D_F$:

the curvature of the seating regions (168, 170) corresponding to the curvature of the cam shaft 24;

engagement of the cam shaft 24 with more than one seating region (168, 170); and each of the seating regions (168, 170) being disposed at an acute angle α from a point 194 towards which the motion of the cam shaft 24 is directed.

Figure 4C:
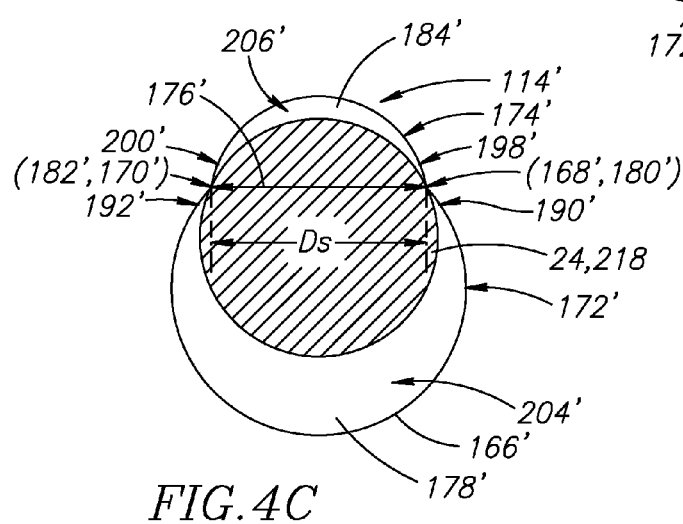
FIG. 4C is a schematic side view of another cam opening with a cam shaft of a cutting tool holder inserted therein.

Drawing attention to FIG. 4C, it will be understood that for a recessed area to be provided, the seating regions (168, 170) need not be elongated regions but can each be constituted by a single point (168', 170') in the plan view of the opening shown. In such case, the center points of the two seating regions (168', 170') merge into a common center point located where an imaginary line connecting the two seating regions (168', 170') intersects the plane $P_R$.

To elaborate, the non-limiting example of an alternative cam opening 114' in FIG. 4C has elements corresponding to elements of the cam opening 114 in FIGS. 4A and 4B, which are designated with identical numerals suffixed with an apostrophe, the only difference being that the alternative seating regions (168', 170') of alternative cam opening 114' are constituted by single points (168', 170') in the view shown.

The alternative cam opening 114' can comprise a major peripheral edge 172' extending between alternative two edge ends (180', 182') which constitute seating regions (168', 170'). The cam opening 114' can also comprise an additional peripheral edge 174' extending between, and engaging, the seating regions (168', 170').

While the example shown in FIGS. 4A and 4B is preferred due to possible additional advantages thereof, certain advantages are possibly attainable even by the example in FIG. 4C.

It will be understood that a clamping mechanism having an opening with any of the features above, that can provide any of the advantages above, can be advantageous. Some of the features are generalized below.

Such clamping mechanism opening can be defined as an opening provided with a major peripheral edge extending between two seating regions on one side of a constriction (176, 176') defined by the seating regions, and an additional peripheral edge extending between the two seating regions on a second, opposite side of the constriction (176, 176').

The constriction and the additional peripheral edge are sized to provide a space. The sizing can be configured to restrict entry of a cam shaft 24 into the space.

The seating regions can be defined as regions between the major peripheral edge and the additional peripheral edge. Portions of the major peripheral edge and the additional peripheral edge containing points (190, 190', 192, 192', 198, 198', 200, 200') are adjacent to the associated major and additional edge ends and also to the seating regions, and have center points ($C_M$, $C_P$) spaced from a common center point $C_S$ or center point $C_{S1}$, $C_{S2}$ of the seating regions (168, 170).

Center points of each portion along either the major peripheral edge or the additional peripheral edge can be spaced from a center point of the seating regions.

Center points of portions of the major peripheral edge and additional peripheral edge ($C_M$, $C_P$) which are directly adjacent to the seating regions, can be located on opposing sides of a common center point $C_S$ or center point $C_{S1}$, $C_{S2}$ of the seating regions (168, 170).

As seen in FIG. 4C, the magnitude of a dimension $D_S$ measured between the seating regions in a cam opening is smaller than a maximum dimension $M_{C1}$ of an end portion of a cam shaft configured to be received in the cam opening. The maximum dimension $M_{C1}$ can be an external diameter of an end portion of the cam shaft. Such magnitude of a dimension $D_S$ can be configured to prevent the cam shaft portion to pass therethrough. Such prevention can enable engagement of two spaced seating regions. Stated differently, single-point engagement of the cam shaft with the additional peripheral edge can be avoided.

Drawing attention to FIGS. 5A to 5E, the cam shaft 24 is shown in more detail. The cam shaft 24 can have a unitary one-piece construction. The cam shaft 24 can be elongated with a central longitudinal axis $A_{L2}$ extending through the center thereof, and can comprise first and second cam ends (208, 210) and a central cam portion 212 extending therebetween. The cam shaft 24 can have an external cam surface 214 extending radially with respect to the central longitudinal axis $A_{L2}$ along the periphery of the cam shaft 24. The cam shaft 24 can include a removal arrangement 216.

Figure 5D:
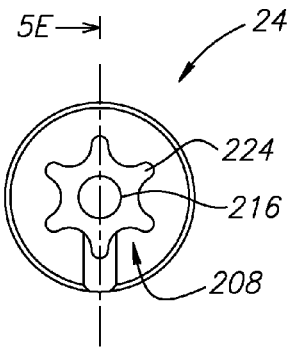
FIG. 5D is a rear view of the cam shaft in FIGS. 5A to 5C.
Figure 5E:
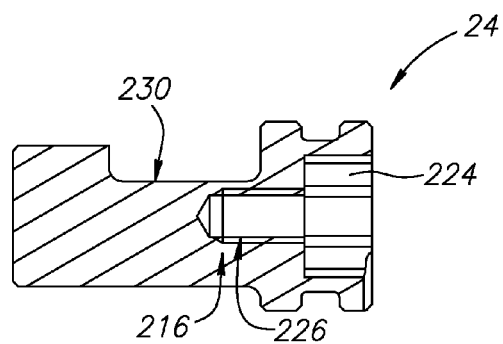
FIG. 5E is a cross section view taken along line 5E-5E in FIG. 5D.
Figure 5C:
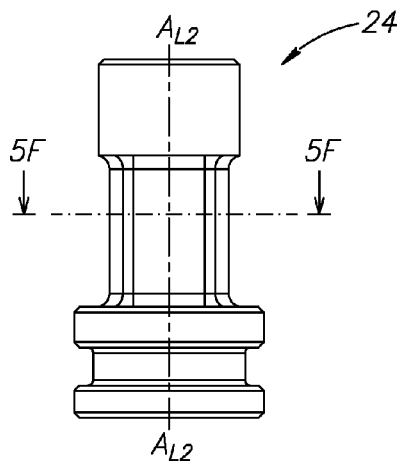
FIG. 5C is a side view of the cam shaft in FIGS. 5A and 5B, rotated 90° from the view in FIG. 5B.
Figure 5B:
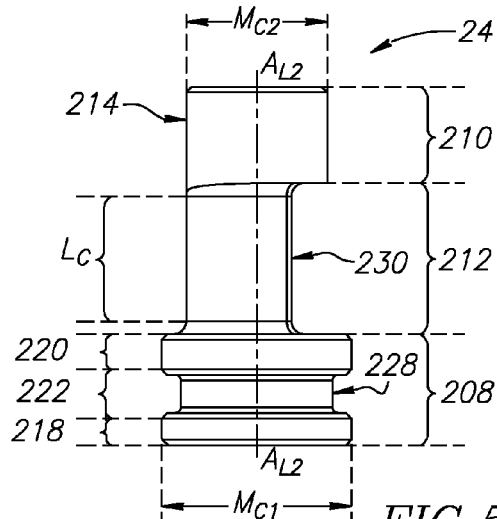
FIG. 5B is a side view of the cam shaft in FIG. 5A.
Figure 5F:
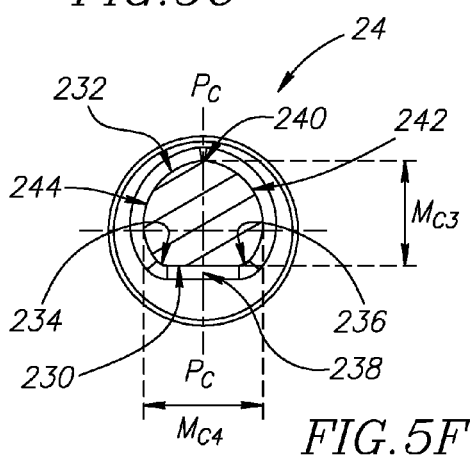
FIG. 5F is a cross section view taken along line 5F-5F in FIG. 5C.
Figure 5A:
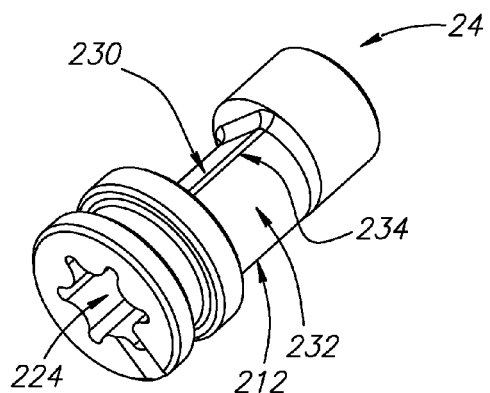
FIG. 5A is a perspective side view of a cam shaft of the cutting tool holder in FIGS. 1A and 1B.

As seen best in FIG. 5B, a maximum dimension of the first end 208, taken perpendicular to the central longitudinal axis $A_{L2}$, is designated $M_{C1}$. A maximum dimension of the second end 210, taken perpendicular to the central longitudinal axis $A_{L2}$, is designated $M_{C2}$. As seen best in FIG. 5F, a first dimension of the central cam portion 212, taken perpendicular to the central longitudinal axis $A_{L2}$, is designated $M_{C3}$, and a second dimension of the central cam portion 212, taken perpendicular to both the central longitudinal axis $A_{L2}$ and the first dimension $M_{C3}$, is designated $M_{C4}$. The magnitude of the first dimension $M_{C3}$ can be smaller than the magnitude of the second dimension $M_{C4}$.

The first cam end 208 can have a cylindrical shape comprising first and second end sections (218, 220), both of which can have a common magnitude of maximum dimension $M_{C1}$, and a central section 222 extending therebetween.

The first end 208 can be formed with tool receiving recess 224 (FIGS. 5D and 5E) which extends into the first end section 218 into the cam shaft 24.

The removal arrangement 216 can be disposed at the tool receiving recess 224 and can extend therefrom. The removal arrangement 216 can comprise at least one laterally extending anchoring wall portion 226. In the non-limiting example shown, the removal arrangement 216 can be a bore formed with threading 226 which constitutes the at least one laterally extending anchoring wall portion. The bore 216 can extend coaxially with the central longitudinal axis $A_{L2}$, and can extend from the first cam end 208 into the central cam portion 212.

The central section 222 can be formed with an external annular recess 228. Consequently, the third end section 222 can have an external diameter smaller than external diameters of both the first and second end sections (218, 220). The external annular recess 228 can be suitable for mounting of a fluid-tight seal thereto, for example an o-ring (not shown).

The central cam portion 212 can comprise a planar section 230 and a curved section 232 extending from corners (234, 236) formed with the planar section 230 and the curved section 232.

The curved section 232 can be symmetrical on opposing sides of a bisection plane $P_C$ which intersects a midpoint 238 of the planar section 230 and a midpoint 240 of the curved section 232. Each symmetrical part of the curved section 232 can constitute a curved sub-section (242, 244). Each curved sub-section (242, 244) can have a varying rate of curvature. It will be understood that a varying rate of curvature is distinct from a constant rate of curvature which follows a circle path. The varying rate of curvature can form a spiral shape. The spiral shape can be an Archimedean spiral.

It will be understood that in accordance with some embodiments, a curved section of a cam shaft (not shown) could be, for example, a single Archimedean spiral extending between the two corners (234, 236) instead of two Archimedean spirals of the two curved sub-sections (242, 244) as shown.

The first dimension $M_{C3}$ can be measured between the midpoints (238, 240) of the planar section 230 and the curved section 232.

The second dimension $M_{C4}$ can be the largest dimension of the central cam portion 212. The second dimension $M_{C4}$ can be measured between points of the curved section 232 which lie on a plane which is parallel with the planar section 230. The second dimension $M_{C4}$ can be measured between points of the curved section 232 which are closer to the planar section 230 than to the point midpoint 240 of the curved section 232.

A magnitude of length of the planar section 230, measured along a dimension parallel with the central longitudinal axis $A_{L2}$, is designated as $L_C$ (FIG. 5B).

The second cam end 210 can be cylindrical. The maximum dimension $M_{C2}$ of the second cam end 210 can be larger than the first dimension $M_{C3}$ of the central cam portion 212.

The maximum dimension $M_{C1}$ of the first cam end 208 can be larger than the first dimension $M_{C3}$ of the central cam portion 212.

The second cam end 210 can be sized to allow insertion thereof into the cam recess 112.

Drawing attention to FIGS. 6A to 6D, the follower 26 is shown in more detail. The follower 26 can have a unitary one-piece construction. The follower 26 can comprise a follower body portion 246 formed with a follower through-bore 248, and a follower head portion 250 extending from the body portion 246. The follower 26 can further comprise a follower seating portion 252 having a cylindrical shape and extending from the follower body portion 246 on an opposing side thereof from the follower head portion 250.

The follower 26 can have opposing front and rear major faces (254, 256), first and second minor faces (258, 260) extending perpendicular thereto, and top and bottom faces (262, 264) perpendicular to each of the front and rear major faces and first and second minor faces (254, 256, 258, 260). A central longitudinal plane $P_L$ can extend through the center of the follower 26 and the first and second minor faces (258, 260) and can be parallel to the front and rear major faces (254, 256). A longitudinal follower axis $A_F$ can extend through the center of the follower 26 and the top and bottom faces (262, 264) thereof. The follower 26 can have a symmetrical shape on both sides of the central longitudinal plane $P_L$. The follower 26 can be elongated between the top and bottom faces (262, 264) thereof.

The follower body portion 246 can comprise, adjacent the follower head portion 250, an annular lip 266 extending transversely relative to the longitudinal follower axis $A_F$. The annular lip 266 can be formed with at least one coolant recess 268 configured to provide a coolant flow path.

The follower through-bore 248 can extend between and open out to the front and rear major faces (254, 256). The follower through-bore 248 can comprise a planar section 270 and a U-shaped curved section 272 extending from corners (274, 276) formed with the planar section 270 and the curved section 272. A magnitude of width of the planar section 270, measured perpendicular to the central longitudinal plane $P_L$, is designated as $W_F$ (FIG. 6B). The follower through-bore 248 can have an irregular shape. For example, the through-bore has a non-cylindrical shape.

The follower head portion 250 can be cylindrical. The follower head portion 250 can comprise an upper portion 278 and a lower neck portion 280 disposed between the upper portion 278 and the annular lip 266.

The upper portion 278 can comprise a plurality of ribs 282. The plurality of ribs 282 can be formed at one or both of the distinct first and second minor faces (258, 260) of the upper portion 278. The upper portion 278 can be devoid of ribs at the front and rear major faces (254, 256) thereof. Stated differently, the face or faces (258, 260) can include a plurality of ribs 282 and can be separated by another face (254, 256) of the follower 26 which is devoid of ribs 282 and/or has a planar surface 284.

The upper portion 278 can have a planar surface 284 at the front and rear major faces (254, 256) thereof. A possible advantage of the at least one recess 268 and planar shape being at a common face can be simplification of manufacture of the follower 26.

Each of the plurality of ribs 282 can be outwardly extending. Each of the plurality of ribs 282 can extend transversely relative to the longitudinal follower axis $A_F$. Each of the plurality of ribs 282 can extend perpendicular relative to the longitudinal follower axis $A_F$. Each of the plurality of ribs 282 can have a flat outer surface 286. Each outer surface 286 can be parallel with the longitudinal follower axis $A_F$. Each of the plurality of ribs 282 can have side surfaces 288 slanted with respect to the longitudinal follower axis $A_F$ and extending from an edge 290 of the flat outer surface 284 in the direction of the longitudinal follower axis $A_F$. Stated differently, each of the plurality of ribs 282 can have a tapered shape along a cross section thereof. Each of the plurality of ribs 282 can be parallel with all of the other ribs 282. The plurality of ribs 282 includes ribs 282 axially spaced relative to the follower axis $A_F$. The plurality of ribs 282 includes a plurality of ribs at extending from one or both of the first and second minor faces (258, 260).

In this non-limiting example, each face (258, 260) can be formed with exactly three axially spaced ribs 282, or, stated differently, three layers of ribs 282. It has been found that using a plurality of axially spaced ribs 282 ribs can provide sufficient structural strength to the follower, while maintaining an acceptable follower head portion 250 size. It is believed that a three-layer configuration can possibly provide an advantageous size-strength arrangement.

The lower neck portion 280 can be suitable for mounting of a fluid-tight seal thereto, for example an o-ring (not shown).

Drawing attention to FIGS. 7A to 7D, operation of the cutting tool holder 10 is shown.

Figure 7A:
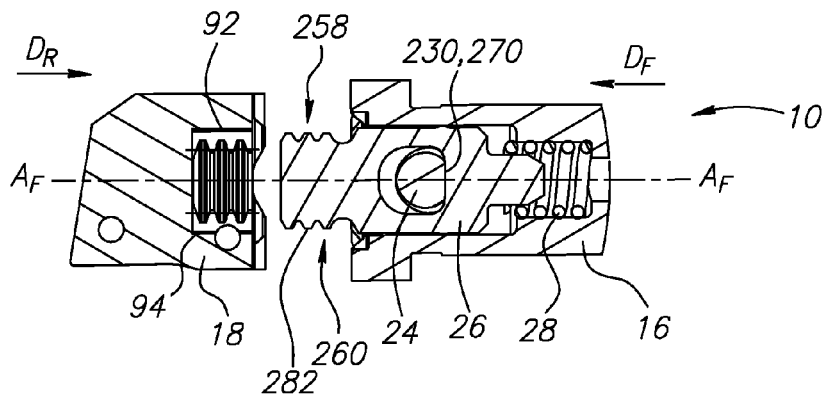
FIG. 7A is a cross section side view of the cutting tool holder in FIGS. 1A and 1B, in a detached position.

In the cutting tool holder's 10 detached position, shown in FIG. 7A, the cam shaft 24 can be mounted in the cutting tool holder 10 with the first cam end 208 being disposed in the cam opening 114 (FIG. 3A), the second cam end 210 being disposed in the cam recess 112 (FIG. 3A), and the central cam portion 212 being disposed in the follower through-bore 248.

The central cam portion 212 can be oriented such that the planar section 230 thereof engages the planar section 270 of the follower through-bore 248. Such engagement is possible as the magnitude of length $L_C$ of the central cam portion 212 is greater than the magnitude of width $W_F$ of the follower 26. The biasing member 28 can be at a maximum extension thereof and can bias the follower to protrude from the body portion 16. The cam shaft 24 is configured for only rotational motion to bring the tool holder 10 to the clamped and unclamped positions. In the present example, the cam shaft 24 is mounted to the body portion 16 in an arrangement which only allows rotational motion thereof. Consequently, the cam shaft 24 extends through the follower through-bore 248 in both the clamped and unclamped positions, and any transitional position therebetween, thereby preventing undesired ejection of the follower 26 from the body portion 16. The first and second minor faces (258, 260) of the follower 26, which have the plurality of ribs 282, can be aligned with the flat first and second sub-surfaces (92, 94) of the locking bore 176.

Figure 7B:
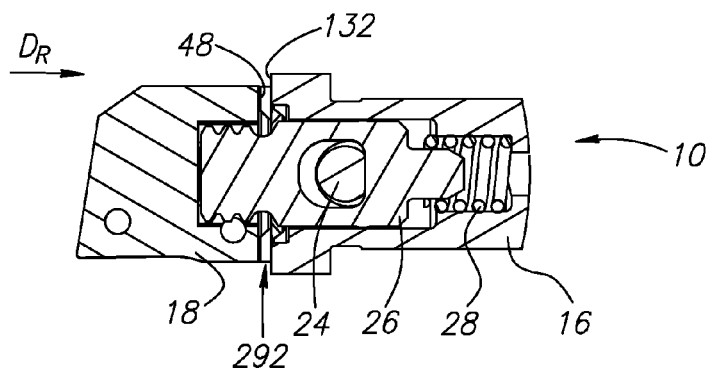
FIG. 7B is a cross section side view of the cutting tool holder in FIG. 7A, in an attached-unlocked position.

The head portion 18 can be moved in the rearward direction $D_R$ and/or the body portion 16 can be moved in the forward direction $D_F$ to bring the cutting tool holder 10 to the attached-unlocked position in FIG. 7B. In such position the head portion 18 can be seated on the top face 262 of the follower 26.

Notably, a biasing force of the biasing member 28 can be sufficient to space the body portion 16 and the head portion 18 when seated thereon and held in a vertical orientation. Such spacing provides a gap 292 between the base surface 132 of the body portion 16 and the base surface 48 of the head portion 18. The gap 292 can be sufficiently wide to prevent contact of the body portion 16 and head portion 18 and provide clearance between the protrusions 50 of the head portion 18 and the base surface 132 of the body portion 16.

Figure 7C:
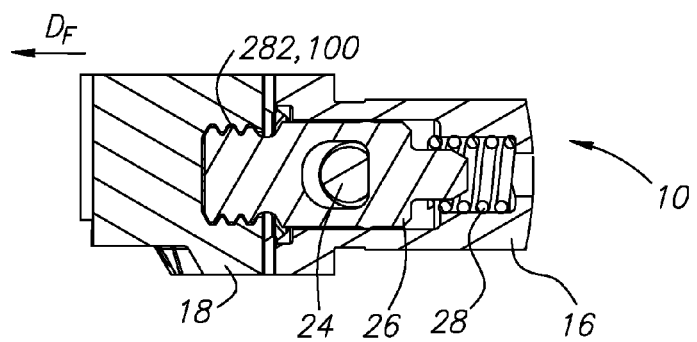
FIG. 7C is a cross section side view of the cutting tool holder in FIGS. 7A and 7B, in an attached-locked position.

The head portion 18 or body portion 16 can be rotated a quarter turn, clockwise or counter clockwise, to bring the cutting tool holder 10 to the attached-locked position in FIG. 7C. As the biasing force is sufficient to maintain the body portion 16 spaced apart from the head portion 18 in the protruded position shown, when the body portion 16 is held in a vertical orientation with the head portion 18 seated thereon, only a rotational force need be applied thereto to rotate the head portion 18. Stated differently, the head portion 18 can be advantageously rotated without having to first be appropriately positioned by application of a lifting force thereon.

Such rotation can bring the plurality of ribs 282 into alignment with the grooves 100 of the head portion 18. Interlocking of the plurality of ribs 282 and grooves 100 can prevent motion of the head portion 18 in the forward direction $D_F$ relative to the body portion 16. Such interlocking can possibly prevent undesired ejection of the head portion 18 from the body portion 16.

Figure 7D:
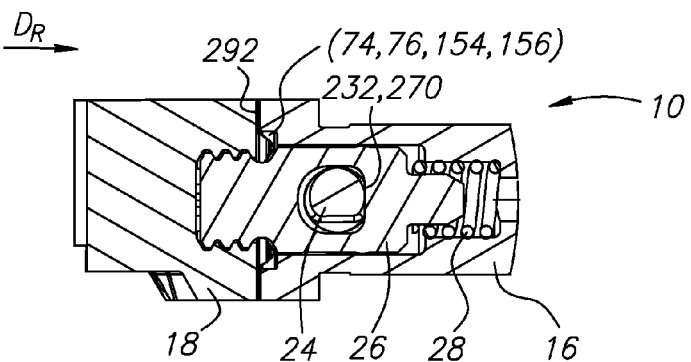
FIG. 7D is a cross section side view of the cutting tool holder in FIGS. 7A to 7C, in a clamped position.

The cam shaft 24 can then be rotated a quarter turn, clockwise or counter clockwise, to bring the cutting tool holder 10 to the clamped position in FIG. 7D, with the curved section 232 of the cam shaft 24 moving the planar section 270 of the follower 26 in the rearward direction $D_R$ with respect to the body portion 16. Stated differently, the planar section 270 is configured to engage the curved section 232 of the cam shaft 24. As each curved sub-section (242, 244) is configured for the engagement with the follower through-bore 248 the cam shaft 24 can be rotated either clockwise or counterclockwise to bring the cutting tool holder 10 to the clamped or unclamped position. Notably, the curvature of each curved sub-section is configured to allow the tool holder 10 to be brought to the clamped or unclamped position upon a quarter turn of the cam shaft 24.

Such movement can compress the biasing member 28, and can reduce the width of the gap 292. Movement of the head portion 18 relative to the body portion 16 can be arrested by engagement of the abutment surfaces (74, 76) of the head portion's protrusions 50 with the abutment surfaces (154, 156) of the body portion's recesses 134. Notably, the only contact between head portion 18 and the body portion 16 is via the abutment surfaces (74, 76, 154, 156). It is further noticed that engagement of the cam shaft 24 with the follower through-bore 248 is with the planar section 270 of the follower through-bore 248 only. It will be understood that the biasing member 28 can be configured to apply a continuous biasing force on the follower 26, in both the clamped and unclamped positions, and any transitional position therebetween. Such continuous application of force assists in preventing undesired ejection of the cam shaft 24 from the body portion 16.

Preferably, the abutment surfaces are configured such that all of the abutment surfaces (74, 76) of the head portion's protrusions 50 and all of the abutment surfaces (154, 156) of the body portion's recesses 134 are in contact simultaneously. Such arrangement can prevent, for example, wobbling.

To remove the head portion 18, the steps above are carried out in the reverse order. Notably, while rotating the cam shaft 24, rapid engagement of corresponding planar sections (230, 270) of the central cam portion 212 and follower through-bore 248 can allow the biasing member 28 to urge the head portion 18 in a direction away from the body portion 16, so that the head portion 18 can be rotated immediately thereafter, due to the gap 292, without undesired engagement therebetween.

To remove the cam shaft 24 from the body portion 16, a force can be applied to the follower 26 in the rearward direction $D_R$, thereby compressing the biasing member 28. Then, a tool (not shown) formed with a laterally extending anchoring portion, such as an external threading, can be inserted into the removal arrangement 216 of the first cam end 208 and engaged with the laterally extending anchoring wall portion 226, and subsequently withdrawn from the body portion 16 together with the cam shaft 24.

Possible advantages of the construction above can include:
provision of four spaced interlocking elements on each engagement face for stabilization of the head portion 18 in the clamped position (i.e. prevention of rocking or wobbling of a head portion on the body portion);
provision of four evenly spaced interlocking elements along the periphery of each engagement face for stabilization of the head portion 18 in the clamped position;
provision of four spaced interlocking elements on the head portion and body portion allows a head portion to be clamped to a body portion in up to four different positions on a body portion as will be further described below; stated differently, the engagement faces of the head portion and body portion can be configured for clamping engagement with each other at four different positions;
the modular cutting tool holder 10 can be configured to be brought to the four different positions via four successive quarter turns of the body portion 16 or the head portion 32, as will be further described below;
restraint of the head portion 18 to rotation in both the clockwise and counter-clockwise directions due to engagement of oppositely slanted abutment surfaces (74, 76, 154, 156);
resistance of the head portion 18 to rotation due to positioning of the interlocking elements (50, 134), and specifically the abutment surfaces (74, 76, 154, 156), spaced from the centerpoint of the engagement face 62 thereof; stated differently each interlocking element (50, 134) is disposed at portion of the engagement face 32 distal to the centerpoint 62 thereof, thereby increasing magnitude of moment required to rotate the head portion 10 with respect to the body portion 16;
ease of assembly and variability of positioning, due to the ability to rotate the head in either direction to bring it to the attached-locked position from the attached-unlocked position;
ease of assembly with the cutting tool holder 10 being configured to be brought to both the clamped and unclamped positions with the cam shaft 24 and follower 26 both still being held to the body portion 16;
speed of assembly, due to the head and/or cam shaft 24 requiring no more than a quarter turn rotation;
ease of manufacture, due to the recesses 134 being formed with a component of possibly stiffer material;
reduced width due to the use of multiple ribs;
perpendicular orientation of the plurality of ribs 282 has been found to be less prone to undesired jamming during assembly, than ribs with slanted orientation;
mounting of the cam shaft 24 to the body portion 16 is at two opposing ends thereof (208, 210) permitting only rotational motion of the cam shaft 24 and/or application of force on the follower 26 in the direction of clamping (i.e. along a single axis, for example only in the forward and rearward directions, without having part of the force applied in a direction tangential thereto); and
a varying curvature, in particular one forming a spiral shape, of the curved sub-sections (242, 244) or, a continuous curve (not shown), can prevent unintentional reverting rotation of the cam shaft from the clamped position.

Drawing attention to FIGS. 8A to 8D, an alternative follower 296 is shown.

The alternative follower 296 can have any of the features of the follower 26 described above, with the only significant difference being that, at the follower head portion 297 thereof, an alternative plurality of outwardly extending ribs 298 are formed at intersections 300 of the front and rear major faces (254, 256) and first and second minor faces (258, 260). The follower head portion 297 is devoid of ribs between the intersections 300. Thus, the follower head portion 300 can have four faces 302 devoid of ribs 298, extending between four sets of adjacent ribs 298.

The intersections 300 can constitute sub-faces of the alternative follower 296. Accordingly, in the non-limiting embodiment shown, there are exactly four sub-faces 300, i.e. the intersections, formed with a plurality of ribs 298.

Figure 9A:
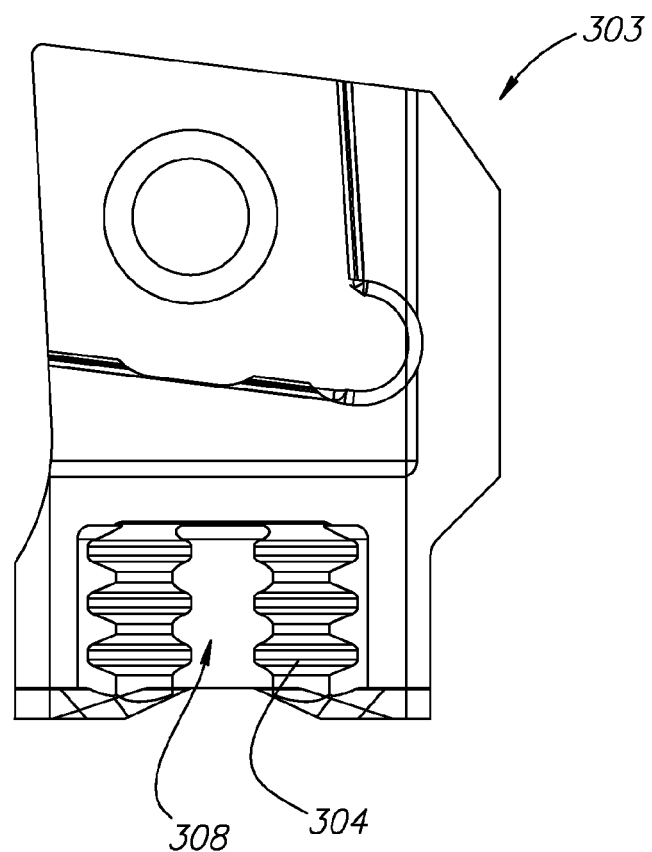
FIG. 9A is a side view of a head portion configured for the follower in FIGS. 8A to 8D.
Figure 9B:
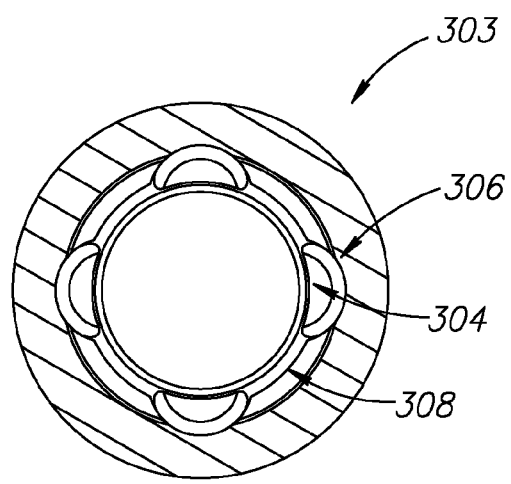
FIG. 9B is a bottom view of the head portion in FIG. 9A.

A possible advantage of such construction can be that an alternative head portion 303 (FIGS. 9A and 9B) formed with alternative grooves 304 at sub-surfaces 306 and planar or rib free alternative sub-surfaces 308, configured to interlock with the ribs 298 of the alternative follower 296, can be brought to four different positions on a body portion, and not only two as described above. This can allow additional tool configuration variability.

The intersections can constitute sub-surfaces of the alternative head portion 118. Accordingly, in the non-limiting embodiment shown, there are exactly four sub-surfaces 306, i.e. the intersections, formed with a plurality of grooves 304.

It will be understood that the above-examples relate to head and body portions having four planar walls, however if the head and body portions are, for example, cylindrical, there could conceivably be different numbers of sets of ribs, as desired. Such number can allow a corresponding number of positions of a head portion with respect to a body portion. To generalize a follower in accordance with the subject matter of the present application can be brought to a plurality of positions on a body portion, as desired. It will also be understood that according to some embodiments, a follower and corresponding head portion can be configured for one or more ribs (i.e. located in a single plane), and need not have the number of ribs or sets of ribs exemplified in the drawings.

It will be understood that while there may be advantages in some embodiments for the protrusions (50) to be formed on the head portion (18) and the recesses (134) to be formed on the body portion (16), there may be other embodiments where such advantages are not present. Accordingly, it is feasible that protrusions, having any of the features described above, can be formed on a body portion of a modular cutting tool holder and recesses, having any of the features described above, can be formed on a head portion of a modular cutting tool holder.

What is claimed is:

1. A modular cutting tool holder portion (16, 18) for a metal-working machine, comprising a four-way indexable first engagement face (32, 106) configured for clamping engagement with a corresponding four-way indexable second engagement face of a complementary modular cutting tool holder portion (18, 16);
the first engagement face (32, 106) comprising
a base surface (48, 132) and
interlocking elements (50, 134) in the form of exactly four projecting protrusions (50) or exactly four recesses (134);
each interlocking element (50, 134) comprising
a non-contact surface (68, 148) spaced from the base surface (48, 132) and having two opposing edges (70, 72, 150, 152) between which it extends, and
two abutment surfaces (74, 76, 154, 156) each extending from a respective one of the two opposing edges (70, 72, 150, 152) to the base surface (48, 132) and being configured for the clamping engagement; wherein:
each protrusion (50) or recess (134) has a first end (56, 138) located at an intersection (58, 140) of the first engagement face (32, 106) with an external peripheral surface (30, 118) of the modular tool holder portion; and
each protrusion (50) or recess (134) extends from the first end (56, 138) to a second end (60, 142) disposed along the first engagement face (32, 106) and spaced from the external peripheral surface (30, 118).

2. The modular cutting tool holder portion (16, 18) according to claim 1, wherein each external peripheral surface (30, 118) comprises adjacent sub-surfaces (38, 40, 42, 44, 120, 122, 124, 126), with adjacent pairs meeting at a common edge (46, 128), the first ends (56, 138) being located at an intersection of the respective first and second engagement face (32, 106) and the external peripheral surface (30, 118) at the common edge (46, 128).

3. The modular cutting tool holder portion (16, 18) according to claim 1, wherein the portion (18) is a head portion (18) configured for holding one or more cutting elements (20).

4. The modular cutting tool holder portion (18) according to claim 3, wherein the interlocking elements (50, 134) are exactly four projecting protrusions (50).

5. The modular cutting tool holder portion (16, 18) according to claim 4, wherein the first base surface (48) has a ring-shaped inner portion (52) thereof disposed between one or each of the protrusions (50) and the locking bore (36).

6. The modular cutting tool holder portion (16) according to claim 4, wherein the first engagement face (32) is formed with a bore (36) extending therein, the bore (36) comprising a bore edge (78) having an elongated shape and located at the first engagement face (32), a bore internal surface (80) extending from the bore edge (78) inwardly into the head portion (18), and a bore end surface (82) distal from the engagement face (32).

7. The modular cutting tool holder portion (16, 18) according to claim 1, wherein each of the interlocking elements (50, 134) is disposed at a portion of the first engagement face (32, 106), which portion is distal to a centerpoint (62, 144) thereof.

8. The modular cutting tool holder portion (16, 18) according to claim 1, wherein each of the interlocking elements (50, 134) has a tapered shape.

9. The modular cutting tool holder portion (16, 18) according to claim 1, wherein each of the abutment surfaces (74, 76, 154, 156) is planar.

10. The modular cutting tool holder portion (16, 18) according to claim 1, wherein each of the abutment surfaces (74, 76, 154, 156) is slanted with respect to the base surface (48, 132) and/or the non-contact surface (68, 148).

11. A modular cutting tool holder (10) for a metal-working machine comprising a body portion (16) in accordance with claim 1, and a complementary head portion (18) in accordance with claim 1; wherein
one of the body and head portions (16, 18) comprises the interlocking elements (50, 134) in the form of exactly four projecting protrusions (50) and the other of the body and head portions (16, 18) comprises the interlocking elements (50, 134) in the form of exactly four corresponding recesses (134);
the head portion (18) is configured to hold one or more cutting elements; and wherein the only contact between the body and head portions (16, 18) is via the abutment surfaces (74, 76, 154, 156) of the interlocking elements (50, 134).

12. The modular cutting tool holder (10) according to claim 11, wherein the first and corresponding second engagement faces (32, 106) are configured for clamping engagement with each other at four different positions.

13. The modular cutting tool holder (10) according to claim 12, configured to be brought to each of the four different positions via successive quarter turns of one of the body portion (16) and head portion (18) relative to the other.

14. The modular cutting tool holder (10) according to claim 11, wherein oppositely slanted abutment surfaces (74, 76) of the head portion (18) contact oppositely slanted respective abutment surfaces (154, 156) of the body portion (16) to prevent relative rotation of the head and body portions (18, 16) in both the clockwise and counterclockwise directions.

15. The modular cutting tool holder (10) according to claim 11, wherein all of the eight abutment surfaces (74, 76, 154, 156) of the head portion (18) and all of the eight abutment surfaces (74, 76, 154, 156) of the body portion (16) are configured to contact simultaneously.

16. The modular cutting tool holder (10) according to claim 11, wherein the interlocking elements (50, 134) are evenly spaced along a periphery of each engagement face (32, 106).

17. The modular cutting tool holder (10) according to claim 11, wherein the head portion and body portion are configured to rotate, relative to each other, in the clockwise and counterclockwise direction in an attached-unlocked or attached-locked position.

18. The modular cutting tool holder (10) according to claim 11, wherein an outermost surface or surfaces (64) of the first end (56) of each protrusion (50) at the peripheral surface (30) is planar and/or an outermost surface (66) of the second end (60) of each protrusion (50) is concave.

19. The modular cutting tool holder (10) according to claim 11, wherein the body portion (16) is made of a material having greater stiffness than a material of which the head portion (18) is made.

20. A cutting head portion (18) configured to hold one or more cutting elements and comprising:
an external peripheral surface (30); and
a four-way indexable engagement face (32) comprising a base surface (48) and exactly four projecting protrusions (50); wherein:
each protrusion (50) extends from a first end (56) proximate the external peripheral surface (30), in an inward direction, to a second end (60) further from the external peripheral surface (30) than the first end (50);
each protrusion (50) comprises:
a non-contact surface (68) spaced from the base surface (48) and having two opposing edges (70, 72) between which it extends, and
two abutment surfaces (74, 76), each extending from a respective one of the two opposing edges (70, 72) to the base surface (48).

21. A cutting head portion (18) configured to hold one or more cutting elements and comprising:
an external peripheral surface (118); and
a four-way indexable engagement face (106) comprising a base surface (132) and exactly four recesses (134); wherein:
each recess (134) extends from a first end (138) proximate the external peripheral surface (118), in an inward direction, to a second end (142) further from the external peripheral surface (118) than the first end (136);
each recess (134) comprises:
a non-contact surface (148) spaced from the base surface (132) and having two opposing edges (150, 152) between which it extends, and
two abutment surfaces (154, 156), each extending from a respective one of the two opposing edges (150, 152) to the base surface (132).

22. A modular cutting tool holder (10) for a metal-working machine comprising
a cutting head portion (18) configured for holding at least one cutting element (20) and comprising a four-way indexable first engagement face (32) having an external peripheral surface (30), a first base surface (48, 132) and interlocking elements (50, 134) in the form of either exactly four projecting protrusions (50) or exactly four recesses (134); and
a body portion (16) comprising a four-way indexable second engagement face (106) having an external periphery surface (118), a second base surface (132, 48) and interlocking elements (134, 50) in the form of either exactly four recesses (134) or exactly four projecting protrusions (50);
wherein:
each interlocking element (50, 134) comprises:
a non-contact surface (68, 148) spaced from the respective first or second base surface (48, 132) and having two opposing edges (70, 72, 150, 152) between which it extends, and
two abutment surfaces (74, 76, 154, 156) each extending from a respective one of the two opposing edges (70, 72, 150, 152) to the respective first or second base surface (48, 132) and being configured for the clamping engagement;
wherein either:
the cutting head portion (18) comprises the exactly four protrusions (50), each protrusion (50) extending from a first end (56) proximate the external peripheral surface (30), in an inward direction, to a second end (60) further from the external peripheral surface (30) than the first end (50), while the body portion (16) comprises the four recesses (134);
or
the cutting head portion (18) comprises the exactly four recesses (134), each recess (134) extending from a first end (138) proximate the external peripheral surface (118), in an inward direction, to a second end (142) further from the external peripheral surface (118) than the first end (136), while the body portion (16) comprises the four protrusions (50);
wherein:
the first and second engagement faces (32, 106) are configured for clamping engagement with each other at four different positions; and
the tool holder is configured for the body and head portions (16, 18) to contact each other via only the eight abutment surfaces (74, 76) of the head portion (18) and the eight abutment surfaces (154, 156) of the body portion (18).

23. The modular cutting tool holder (10) according to claim 22, wherein the first ends (56) of the cutting head portion (18) are located at intersections (58) of the first engagement face (32) and the external peripheral surface (30), and the first ends (138) of the body portion (16) are located at intersections (140) of the second engagement face (106) and the external peripheral surface (118).

24. The modular cutting tool holder (10) according to claim 22, wherein each external peripheral surface (30, 118) comprises adjacent sub-surfaces (38, 40, 42, 44, 120, 122, 124, 126), with adjacent pairs meeting at a common edge (46,

128), the first ends (56, 138) being located at an intersection of the respective first and second engagement face (32, 106) and the external peripheral surface (30, 118) at the common edge (46, 128).

25. The modular cutting tool holder portion (16, 18) according to claim 1, wherein an outermost surface or surfaces (64) of the first end (56) of each protrusion (50) at the peripheral surface (30) is planar and/or an outermost surface (66) of the second end (60) of each protrusion (50) is concave.

* * * * *